United States Patent
Ikeda et al.

(10) Patent No.: US 7,894,691 B2
(45) Date of Patent: Feb. 22, 2011

(54) MOUNTING CONFIGURATION AND METHOD OF OPTICAL WAVEGUIDE HOLDING MEMBER

(75) Inventors: Yuko Ikeda, Shinagawa (JP); Toshihiro Kusagaya, Shinagawa (JP); Osamu Daikuhara, Shinagawa (JO)

(73) Assignee: Fujitsu Component Limited, Tokyo (JP)

( * ) Notice: Subject to any disclaimer, the term of this patent is extended or adjusted under 35 U.S.C. 154(b) by 191 days.

(21) Appl. No.: 12/426,321

(22) Filed: Apr. 20, 2009

(65) Prior Publication Data

US 2009/0310907 A1    Dec. 17, 2009

(30) Foreign Application Priority Data

Jun. 16, 2008  (JP) .............................. 2008-156569

(51) Int. Cl.
G02B 6/12 (2006.01)
G02B 6/36 (2006.01)
(52) U.S. Cl. .............................. 385/14; 385/92; 385/93
(58) Field of Classification Search .................... 385/14, 385/92–94
See application file for complete search history.

(56) References Cited

U.S. PATENT DOCUMENTS 7,359,594 B2 * 4/2008 Nishizawa et al. ............. 385/32
7,441,965 B2 * 10/2008 Furuno et al. .................. 385/93
7,625,138 B2 * 12/2009 Hamazaki et al. ............. 385/93
7,665,911 B2 * 2/2010 Hamazaki ..................... 385/93
2007/0237449 A1 * 10/2007 Aoki et al. ..................... 385/14
2008/0205894 A1 * 8/2008 Aoki ............................ 398/135

FOREIGN PATENT DOCUMENTS

JP    2005-115346    4/2005

* cited by examiner

Primary Examiner—Michelle R Connelly Cushwa
(74) Attorney, Agent, or Firm—IPUSA, PLLC

(57) ABSTRACT

An article of manufacture is applied to an optical waveguide holding member including a contact surface on the bottom face, which is to be in contact with a printed circuit board; a connection surface on the back face; an optical waveguide connecting the contact surface and the connection surface; and a lens unit disposed at an end of the optical waveguide. A light curing adhesive is applied to a part of the contact surface, adjacent to the lens unit so that the part is bonded to the printed circuit board. A two-component mixed adhesive is applied to, along peripheries of the contact surface in contact with the printed circuit board, outer edges of lateral-side peripheries adjacent to the lens unit and an outer edge of a back-side periphery close to the back face so that the lateral-side peripheries and the back-side periphery are bonded to the printed circuit board.

9 Claims, 26 Drawing Sheets

MOUNTING CONFIGURATION AND METHOD OF OPTICAL WAVEGUIDE HOLDING MEMBER

BACKGROUND OF THE INVENTION

1. Field of the Invention

The present invention is directed to a mounting configuration and a mounting method of an optical waveguide holding member, and in particular to a mounting configuration and a mounting method of an optical waveguide holding member which has optical waveguides formed along a curved surface and allows an optical signal sent from the outside to be transmitted in a different direction.

2. Description of the Related Art

Due to the development of high-speed, high-capacity communications networks and communications controllers, fiber optic communications have become mainstream. For example, optical fibers are used to connect communications networks, such as the Internet, to information terminals and the like at home and at the office to transmit and receive signals. At the connecting part of a personal computer or a peripheral and an optical fiber (external optical fiber), an optical transceiver is provided to enable bidirectional conversion between an electrical signal and an optical signal. Such an optical transceiver includes an optical waveguide formed between the external optical fiber and a photoelectric conversion device (see Patent Document 1, for example).

[Patent Document 1] Japanese Laid-open Patent Application Publication No. 2005-115346

An optical transceiver like one described above has a structure in which an optical waveguide holding member having an optical waveguide is mounted on a printed circuit board on which a photoelectric conversion device is disposed. In general, the printed circuit board is made of glass epoxy resin, and the optical waveguide holding member is made of translucent olefinic resin. An optical path between the photoelectric conversion device on the printed circuit board and the optical waveguide on the optical waveguide holding member is connected by disposing a light receiving/emitting unit of the photoelectric conversion device to oppose a lens unit formed at the end of the optical waveguide in such a manner as to align their optical centers. The optical transceiver is required to bring the optical centers into alignment with a margin of position accuracy error of plus or minus several micrometers.

In the case where the printed circuit board is made of glass epoxy resin, the linear expansion coefficient of the printed circuit board is $13 \times 10^{-6}/°$ C. On the other hand, the optical waveguide has a linear expansion coefficient of $70 \times 10^{-6}/°$ C. Therefore, for example, if the optical waveguide holding member is mounted on the printed circuit board in an environment at an ordinary temperature of 25° C. and subsequently exposed to an atmosphere at 85° C. due to heat from peripheral devices, the photoelectric conversion device mounted on the printed circuit board is displaced by 10.007 mm, and the lens unit of the optical waveguide holding member opposing the light receiving/emitting unit of the photoelectric conversion device is displaced by 10.038 mm due to thermal expansion. In this case, the relative positional misalignment of the two is about 31 μm.

Conventionally, in order to reduce the relative positional misalignment between the lens unit of the optical waveguide holding member and the light receiving/emitting unit of the photoelectric conversion device due to thermal expansion, the optical axes are aligned in an atmosphere heated to a normal operating temperature of the optical transceiver during the assembly process of the optical transceiver, thereby reducing the misalignment of the optical axes due to thermal expansion.

However, this conventional production process leaves the problem that the production operation becomes complicated and desired position accuracy (inhibiting effect) cannot be obtained, thereby lowering process yield.

In the case where the optical centers of the light receiving/emitting unit of the photoelectric conversion device and the lens unit of the optical waveguide holding member are aligned by the motion control of a robot which automatically mounts the optical waveguide holding member on the printed circuit board, a two-stage adhesion process has been studied since the olefinic resin forming the optical waveguide holding member has weak adhesion. In the first stage of the adhesion process, a light curing adhesive is applied to a contact surface of the optical waveguide holding member, and the optical waveguide holding member is then mounted on the printed circuit board. In the second stage of the adhesion process, once the light curing adhesive hardens, a two-component mixed adhesive having firm adhesion is applied to the perimeter of the contact surface of the optical waveguide holding member in order to fix the optical waveguide holding member to the printed circuit board.

When the optical waveguide holding member is temporarily joined to the printed circuit board with the light curing adhesive after the placement by the robot motion control, the lens unit of the optical waveguide holding member and the light receiving/emitting unit of the photoelectric conversion device have their optical centers aligned to each other. However, unless the light curing adhesive is adequately applied, the optical waveguide holding member may be shifted in position from the fixing position at a time when the two-component mixed adhesive is applied. This results in a change in the relative position, and the lens unit of the optical waveguide holding member and the photoelectric conversion device on the printed circuit board therefore become out of alignment.

SUMMARY OF THE INVENTION

In view of the problems described above, the present invention aims at providing a mounting configuration and a mounting method of an optical waveguide holding member that solve one or more of the above-mentioned problems.

In order to solve the above problems, one aspect of the present invention is an article of manufacture of an optical waveguide holding member made of a resin material and including a contact surface on the bottom face, which is to be in contact with a printed circuit board; a connection surface on the back face, to which an optical fiber is to be connected; an optical waveguide disposed along a curved surface and connecting the contact surface and the connection surface; and a lens unit disposed at an end of the optical waveguide. A light curing adhesive is applied to part of the contact surface which part is adjacent to the lens unit so that the part of the contact surface is bonded to the printed circuit board. A two-component mixed adhesive is applied to, along peripheries of the contact surface in contact with the printed circuit board, outer edges of lateral-side peripheries of the contact surface which lateral-side peripheries are adjacent to the lens unit and an outer edge of a back-side periphery of the contact surface, which back-side periphery is close to the back face so that the lateral-side peripheries and the back-side periphery of the contact surface are bonded to the printed circuit board.

Another aspect of the present invention is a mounting method of an optical waveguide holding member made of a resin material and including a contact surface on the bottom face, which is to be in contact with a printed circuit board; a connection surface on the back face, to which an optical fiber is to be connected; an optical waveguide disposed along a curved surface connecting the contact surface and the connection surface; and a lens unit disposed at an end of the optical waveguide. The mounting method includes the steps of bonding a part of the contact surface adjacent to the lens unit by a light curing adhesive to the printed circuit board; and bonding, among peripheral edges of the contact surface, peripheral edges disposed on lateral sides of the lens unit and a peripheral edge close to the back face by a two-component mixed adhesive to the printed circuit board.

DETAILED DESCRIPTION OF THE PREFERRED EMBODIMENTS

Embodiments that describe the best mode for carrying out the present invention are explained next with reference to the drawings.

(a) First Embodiment

Figure 1:
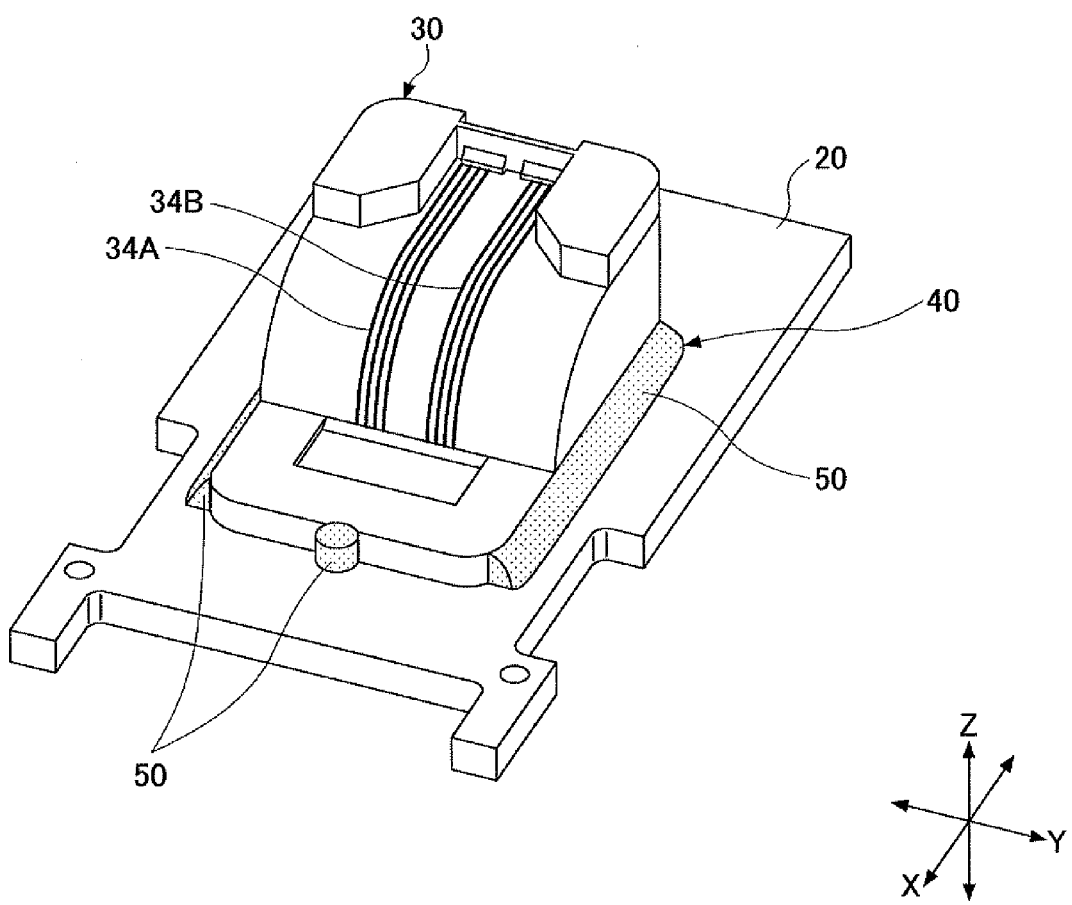
FIG. 1 is a perspective view illustrating a mounting configuration of an optical waveguide holding member according to the first embodiment of the present invention.

FIG. 1 is a perspective view illustrating a mounting configuration of an optical waveguide holding member according to the first embodiment of the present invention. As shown in FIG. X an optical transceiver 10 is formed in which an optical waveguide holding member 30 is mounted on a printed circuit board 20. The optical waveguide holding member 30 is fixed to the printed circuit board 20 by a mounting configuration 40. The mounting configuration 40 fixes the optical waveguide holding member 30 to the printed circuit board 20 using two types of adhesives. In the first stage of the mounting process, using a light curing adhesive (hidden in FIG. 1) with a short curing time, the optical waveguide holding member 30 is temporarily joined to the printed circuit board 20 at a predetermined position, at which the optical waveguide holding member 30 has been placed during an assembly operation performed by a robot. In the second stage, the peripheral edge of the optical waveguide holding member 30 is fixed to the printed circuit board 20 using a two-component mixed adhesive 50 having firm adhesion.

Although other electronic parts are also mounted on the printed circuit board 20, their illustrations and descriptions are omitted.

The optical waveguide holding member 30 of the present embodiment is formed of translucent olefinic resin. Thus, being made of a resin material, the optical waveguide holding member 30 has a linear expansion coefficient of approximately $70 \times 10^{-6}/°C$.

The printed circuit board 20 is formed of glass epoxy resin, and therefore, has a linear expansion coefficient of approximately $13 \times 10^{-6}/°C$. Accordingly, if thermal expansion occurs with a rise in temperature, such a stress is applied that causes a change in the relative position of the printed circuit board 20 and the optical waveguide holding member 30 arising from the difference in their linear expansion coefficients.

Next are described structures of the optical waveguide holding member 30 and the printed circuit board 20. Then, a specific example of the mounting configuration 40 is explained.

Figure 2A:
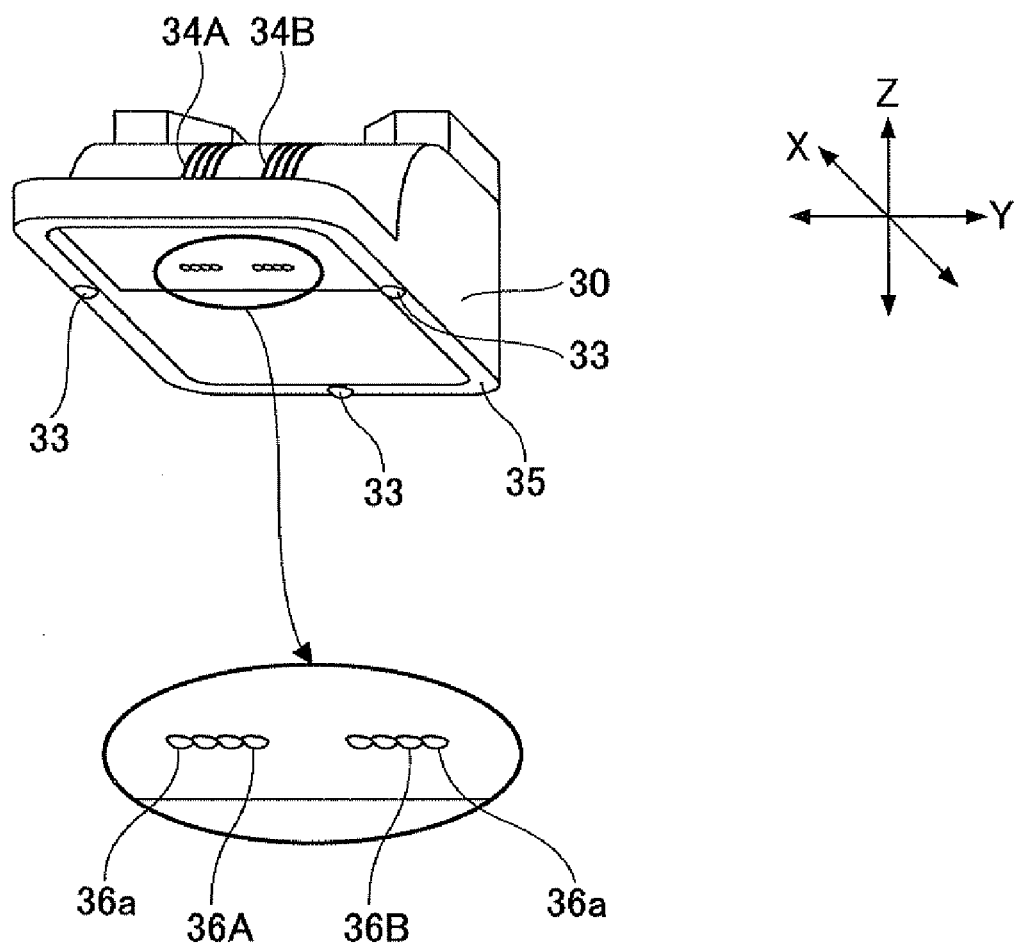
FIG. 2A is a perspective view showing a structure of lens units disposed on the bottom face of the optical waveguide holding member.
Figure 2B:
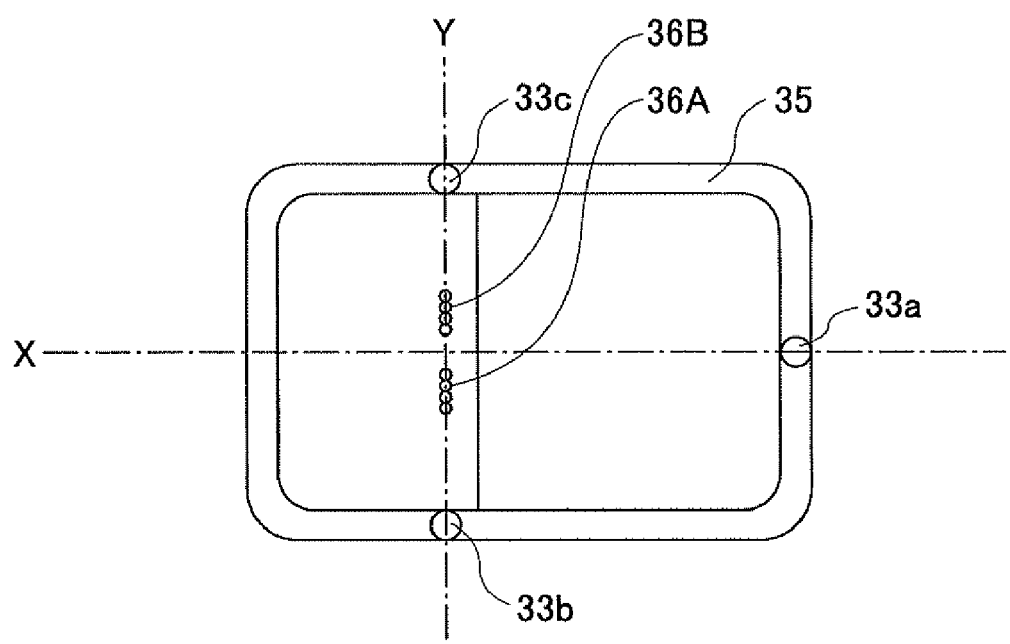
FIG. 2B is a bottom plan view of the optical waveguide holding member.
Figure 3:
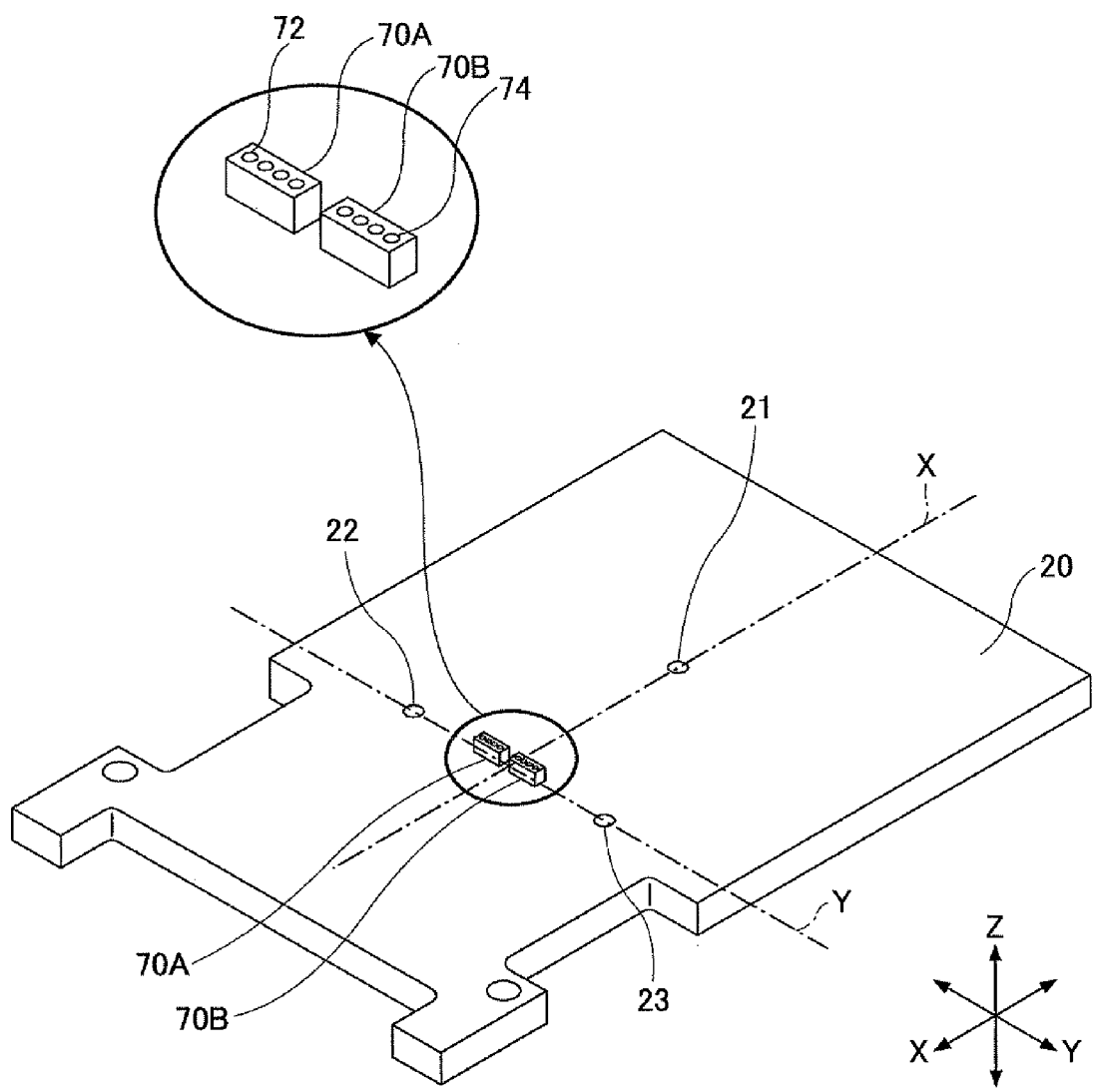
FIG. 3 is a perspective view showing a photo-electric conversion device and an electric-photo conversion device mounted on the upper surface of a printed circuit board.
Figure 4:
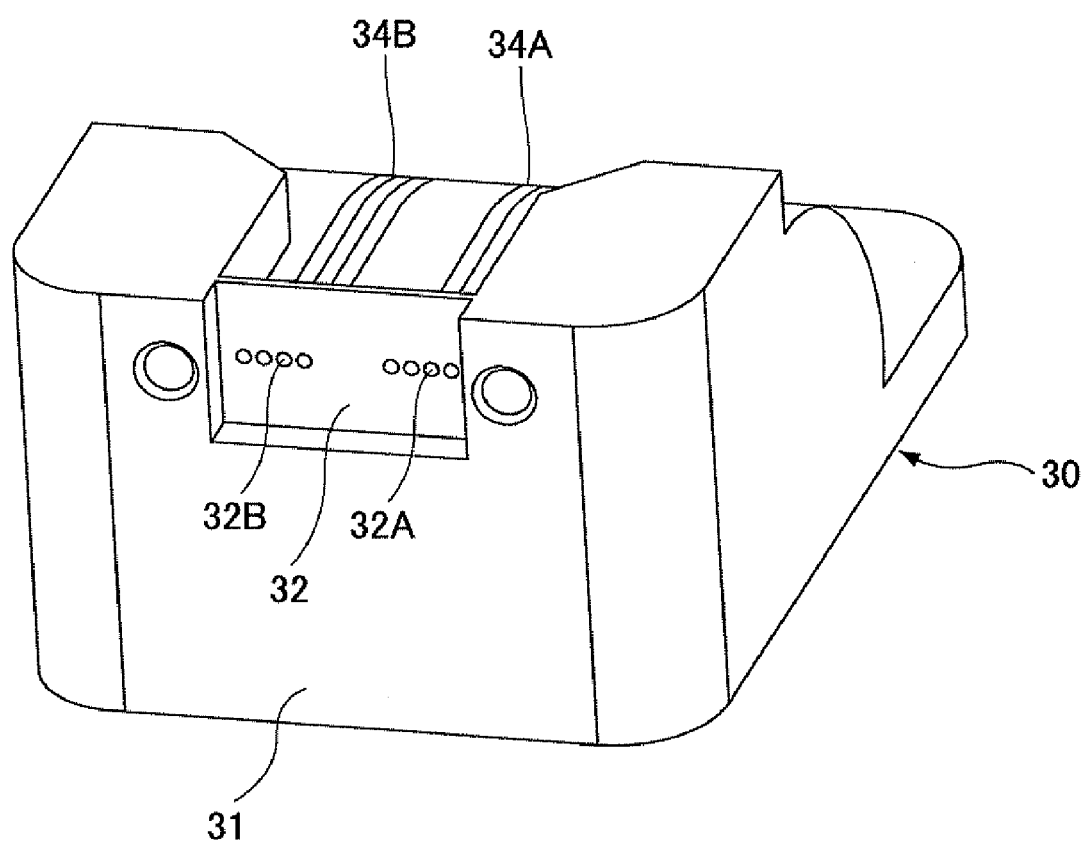
FIG. 4 is a perspective view of the optical waveguide holding member viewed from the back side of the optical waveguide holding member.

FIG. 2A is a perspective view showing a structure of lens units disposed on the bottom face of the optical waveguide holding member. FIG. 2B is a bottom plan view of the optical waveguide holding member 30. FIG. 3 is a perspective view showing a photo-electric conversion device 70A and an electric-photo conversion device 70B mounted on the upper surface of the printed circuit board 20. FIG. 4 is a perspective view of the optical waveguide holding member 30 viewed from the back side of the optical waveguide holding member 30.

The optical waveguide holding member 30 is formed of olefinic resin, which serves as a cladding material. As shown in FIGS. 2A through 4, the optical waveguide holding member 30 includes a connection unit 32 on the back face, to which optical fibers are to be connected; two sets of optical waveguide parts 34A and 34B formed along a curved surface in such a manner as to connect a bottom-side contact surface 35, which is to be in contact with the printed circuit board 20, and the back-side connection unit 32; and two sets of lens units 36A and 36B formed, on the bottom face, in correspondence with the optical waveguide parts 34A and 34B. The connection unit 32 includes an incident (entry) portion 32A into which an optical signal propagating through an optical fiber connected to the incident portion 32A is injected; and an exit portion 32B from which an optical signal is sent into an optical fiber connected to the exit portion 32B.

The photo-electric conversion device 70A for receiving an optical signal propagating through the optical waveguide part 34A and emitted from the lens unit 36A and the electric-photo conversion device 70B for converting an electrical signal into an optical signal and emitting the optical signal to the lens unit 36B are mounted on the printed circuit board 20 in line along the Y direction. The lens units 36A and 36B formed on the bottom face of the optical waveguide holding member 30 are positioned in such a manner as to oppose light receiving elements 72 of the photo-electric conversion device 70A and light emitting elements 74 of the electric-photo conversion device 70B, respectively.

Each of the optical waveguide parts 34A and 34B includes four parallel optical waveguides, and thus, a total of eight optical waveguides are provided in the present embodiment. The optical waveguide part 34A is formed into a curved shape along curved surface inner-wall trenches so that, when an optical signal propagating through the optical fiber is injected from the incident portion 32A of the connection unit 32 on back face, the optical waveguide part 34A emits the optical signal from the lens unit 36A on the bottom face. On the other hand, the optical waveguide part 34B is formed into a curved shape along the curved surface inner-wall trenches so that, when an optical signal emitted from the electric-photo conversion device 70B on the bottom face of the printed circuit board 20 is injected into the lens unit 36B on the bottom face, the optical waveguide part 34B emits the optical signal from the exit portion 32B on the back face to the connected optical fiber.

As shown in FIGS. 2A and 2B, the lens units 36A and 36B each have four spherical lenses 36a at positions corresponding to cores of the optical waveguide parts 34A and 34B, respectively. The contact surface 35 on the bottom face of the optical waveguide holding member 30, which is to be in contact with the printed circuit board 20, is formed in the shape of a rectangular frame. Bosses 33a through 33c are provided, on the contact surface 35, in the center close to the back face side (33a) and on both sides lateral to the lens units 36A and 36B (33b and 33c). Note that the boss 33a close to the back face side is formed on the X axis of the optical waveguide holding member 30, and the bosses 33b and 33c on the lateral sides are formed on the Y axis on which the paired lens units 36A and 36B are provided.

As illustrated in FIG. 3, the photo-electric conversion device 70A and the electric-photo conversion device 70B are mounted at predetermined positions on the printed circuit board 20 in such a manner that each of the multiple light receiving elements 72 and light emitting elements 74 opposes a different one of the multiple spherical lens 36a of the lens units 36A and 36B. Note that the present embodiment is described referring to an example in which the photo-electric conversion device 70A and the electric-photo conversion device 70B are disposed on the printed circuit board 20; however, the positions of the conversion devices on the printed circuit board 20 are arbitrarily determined. For example, the positions of the photo-electric conversion device 70A and the electric-photo conversion device 70B may be changed in the horizontal direction. Similarly, two photo-electric conversion devices 70A may be provided on the printed circuit board 20. Likewise, two electric-photo conversion devices 70B may be provided on the printed circuit board 20. In addition, the number of conversion devices mounted on the printed circuit board 20 is not limited to two, and only one of either of the photo-electric conversion device 70A and the electric-photo conversion device 70B may be provided.

Accordingly, the directions of the optical signals propagating through the optical waveguide parts 34A and 34B are determined depending on the position of the photo-electric conversion device 70A or the position of the electric-photo conversion device 70B mounted on the printed circuit board 20. In addition, the positions of the incident portion 32A and the exit portion 32B of the connection unit 32 are accordingly changed depending on the arrangement of the photo-electric conversion device 70A and the electric-photo conversion device 70B mounted on the printed circuit board 20.

On the upper surface of the printed circuit board 20, locating holes 21 through 23 are provided at three points corresponding to the bosses 33a through 33c. Note that the locating hole 21 corresponding to the boss 33a close to the back face side is formed on the X axis of the mounting position of the optical waveguide holding member 30, and the locating holes 22 and 23 corresponding to the bosses 33b and 33c on the lateral sides are formed on the Y axis on which the photo-electric conversion device 70A and the electric-photo conversion device 70B are provided.

As illustrated in FIG. 4, the incident portion 32A and the exit portion 32B are provided in the connection unit 32 on a back face 31 of the optical waveguide holding member 30 to facilitate the connection of the optical fibers drawn out in a direction parallel to the upper surface of the printed circuit board 20.

The optical waveguide parts 34A and 34B are curved between the connection unit 32 on the back face and the contact surface 35 on the bottom face in such a manner that the emission direction of an optical signal is perpendicular to the injection direction of the optical signal. The number of cores is accordingly selected, and in the case of the present embodiment, four cores each are provided at two positions and these two sets of cores are aligned parallel to each other.

One end of the optical waveguide part 34A is connected to the incident portion 32A on the back face of the optical waveguide holding member 30, and similarly, one end of the optical waveguide part 34B is connected to the exit portion 32B. The other end of the optical waveguide part 34A is connected to the lens unit 36A on the bottom face of the optical waveguide holding member 30, and similarly, the other end of the optical waveguide part 34B is connected to the lens unit 36B. An optical signal sent via the optical fiber connected to the incident portion 32A is transmitted along the cores and emitted from the lens unit 36A in a vertical direction, and then reaches the photo-electric conversion device 70A on the printed circuit board 20 disposed on the lower side of the lens unit 36A. An optical signal emitted from the electric-photo conversion device 70B is injected into the lens unit 36B on the bottom face, and propagates through the optical waveguide part 34B and is then emitted from the exit portion 32B on the back face to the optical fiber connected to the exit portion 32B.

Therefore, when the optical waveguide holding member 30 is fixed on the printed circuit board 20 with an adhesive, it is important to have a positional arrangement that brings into alignment the optical centers of the light receiving elements 72 of the photo-electric conversion device 70A and the spherical lenses 36a of the lens unit 36A and the optical centers of the light emitting elements 74 of the electric-photo conversion device 70B and the spherical lenses 36a of the lens unit 36B.

Achieving the above-mentioned mounting configuration 40 of the optical waveguide holding member 30 is explained next.

Figure 5:
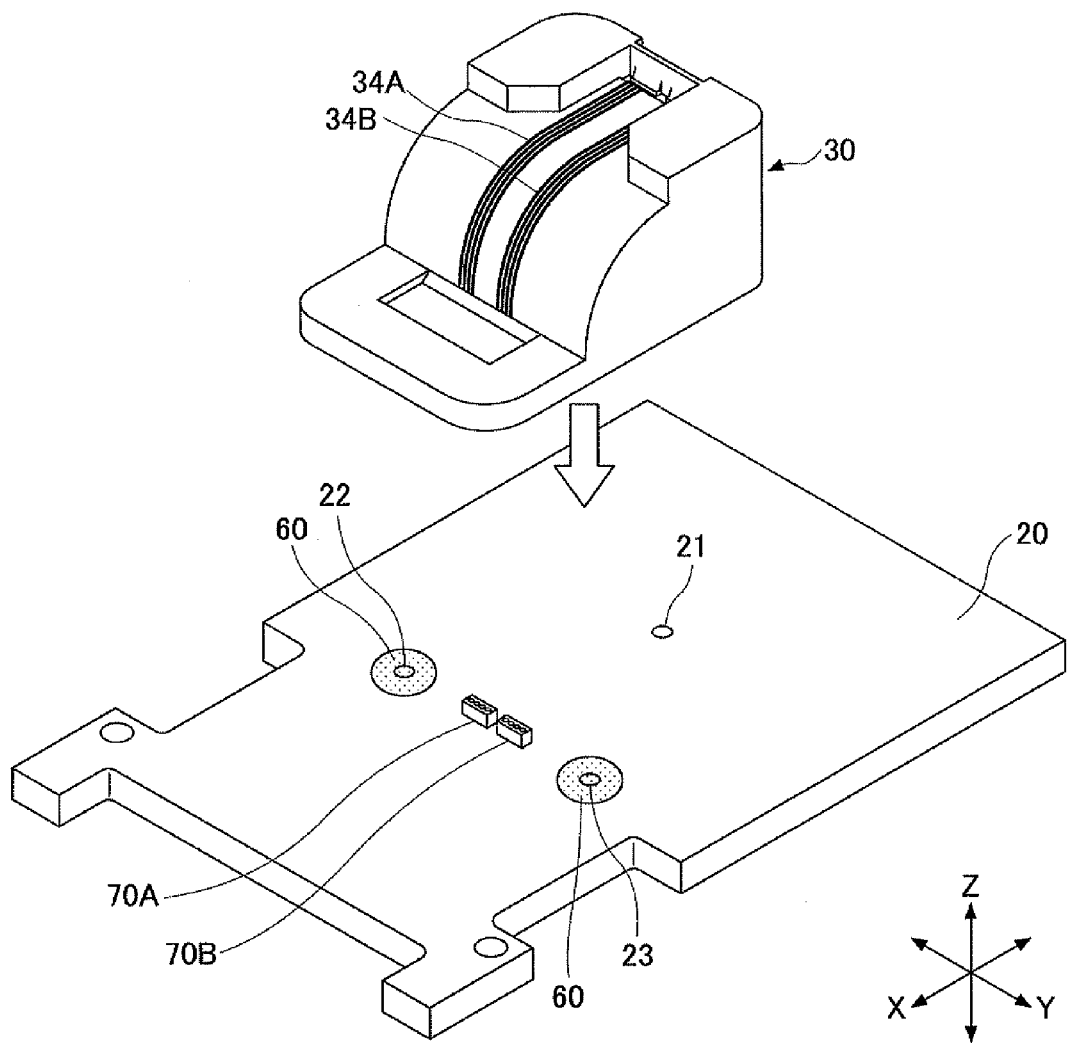
FIG. 5 is an exploded perspective view showing a procedure 1 of the mounting configuration of the optical waveguide holding member when viewed obliquely from above.
Figure 6:
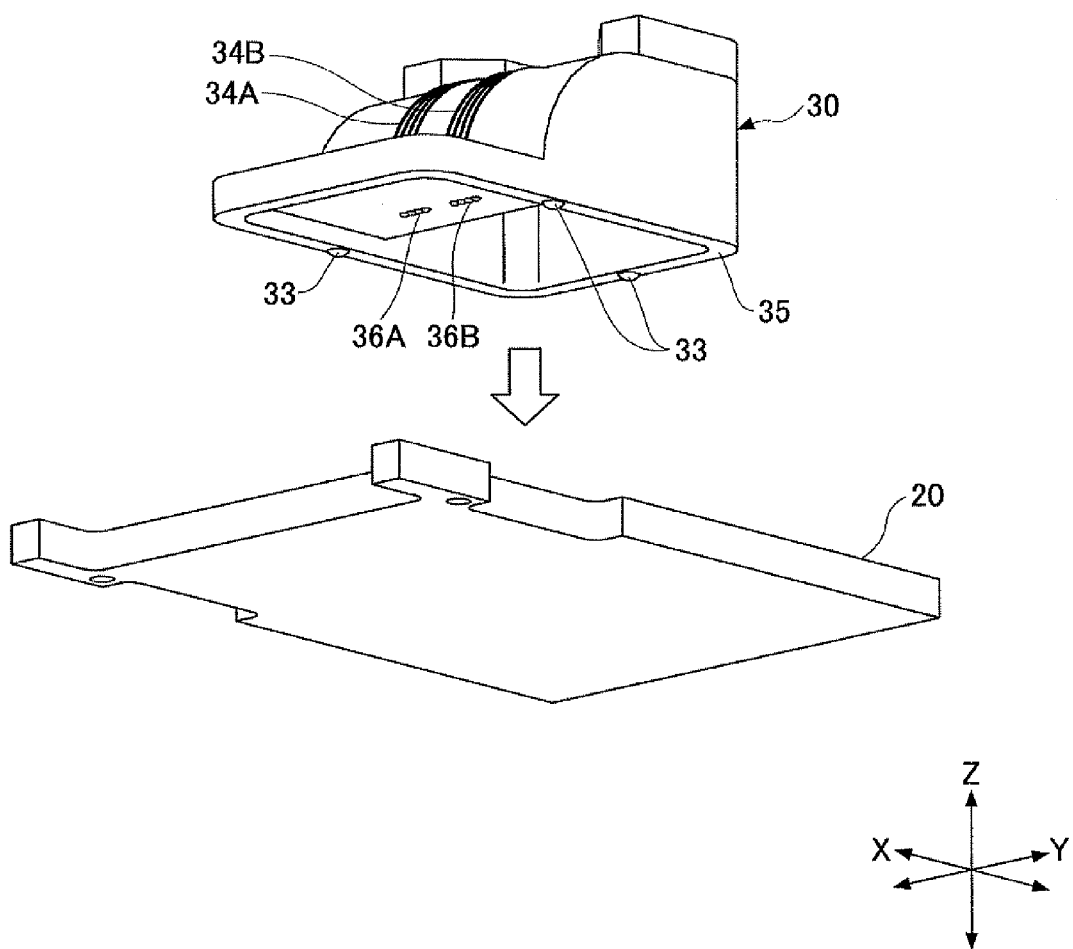
FIG. 6 is an exploded perspective view showing the procedure 1 of the mounting configuration of the optical waveguide holding member when viewed obliquely from below.
Figure 7:
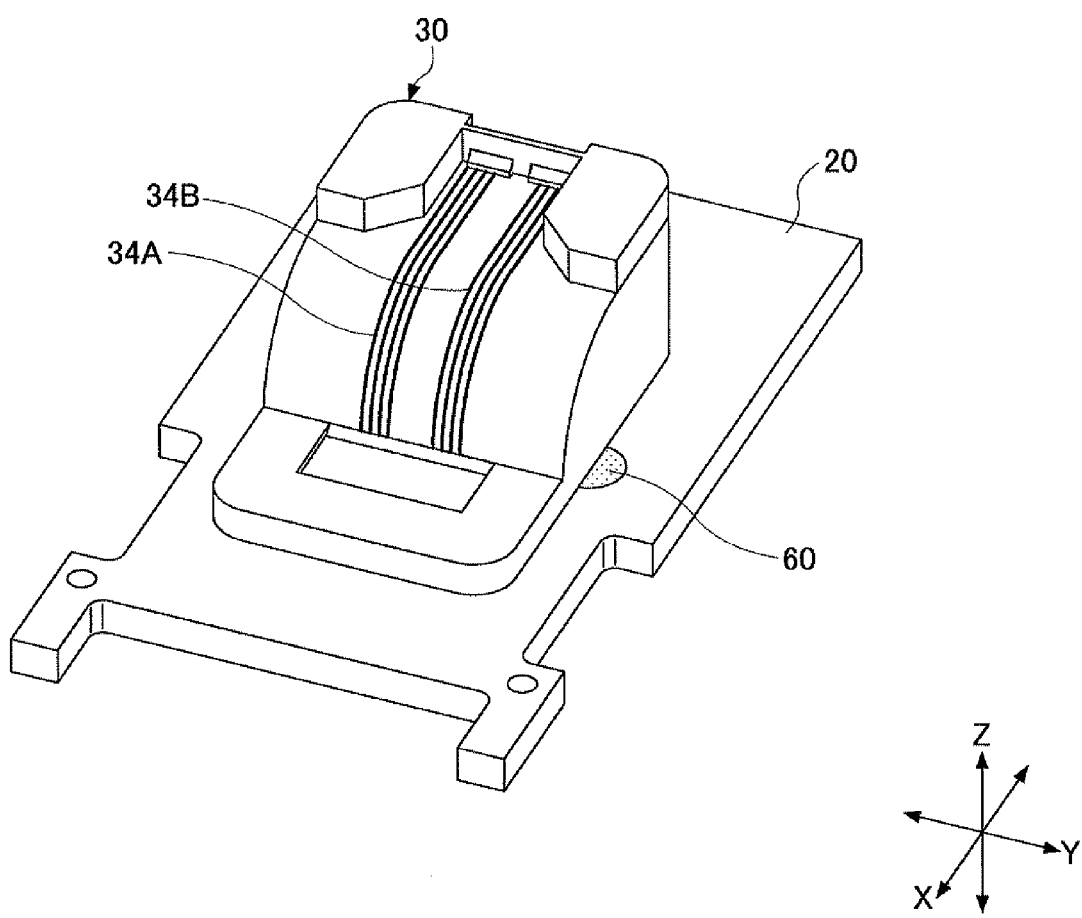
FIG. 7 is a perspective view in which the optical waveguide holding member is mounted on the printed circuit board (procedure 2)
Figure 8:
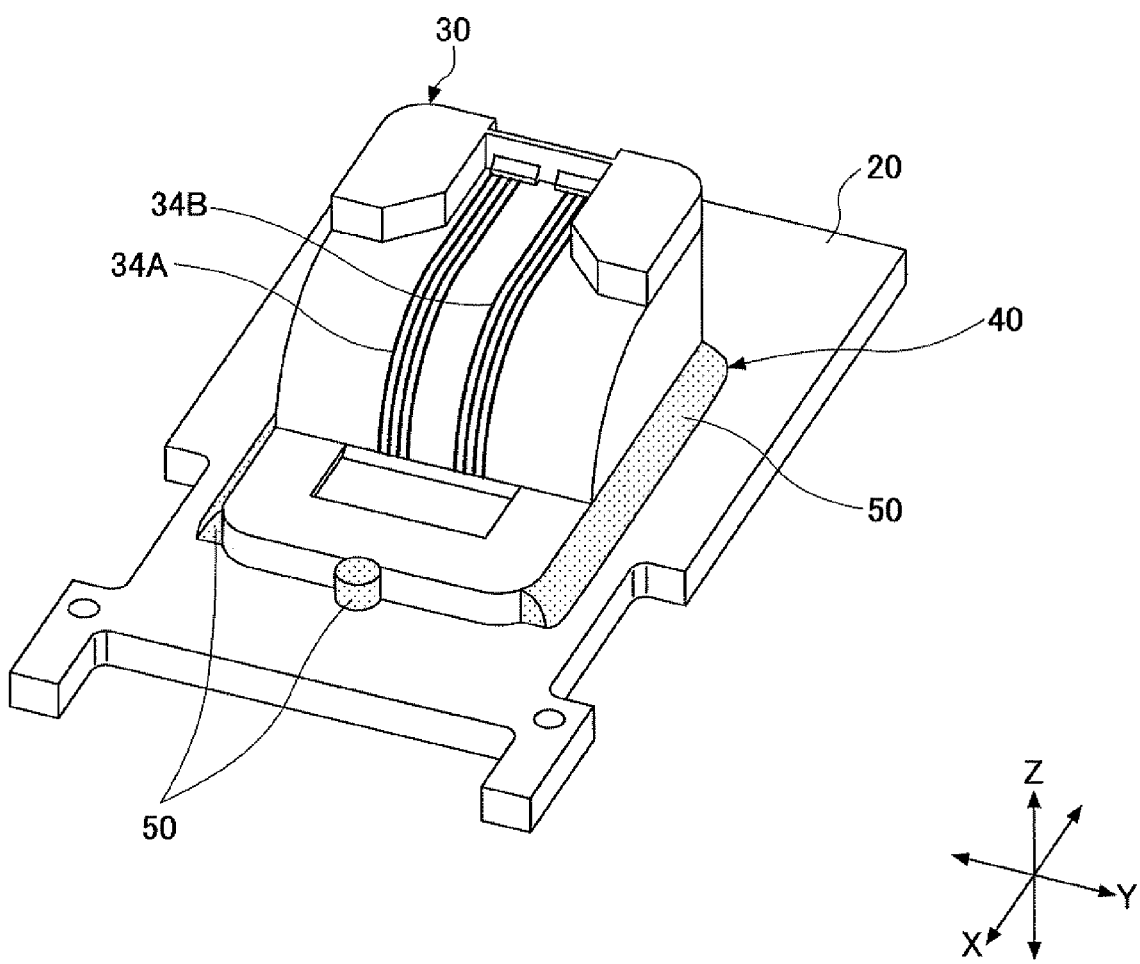
FIG. 8 is a perspective view in which a two-component mixed adhesive is applied to peripheral edges of the optical waveguide holding member mounted on the printed circuit board (procedure 4)
Figure 9:
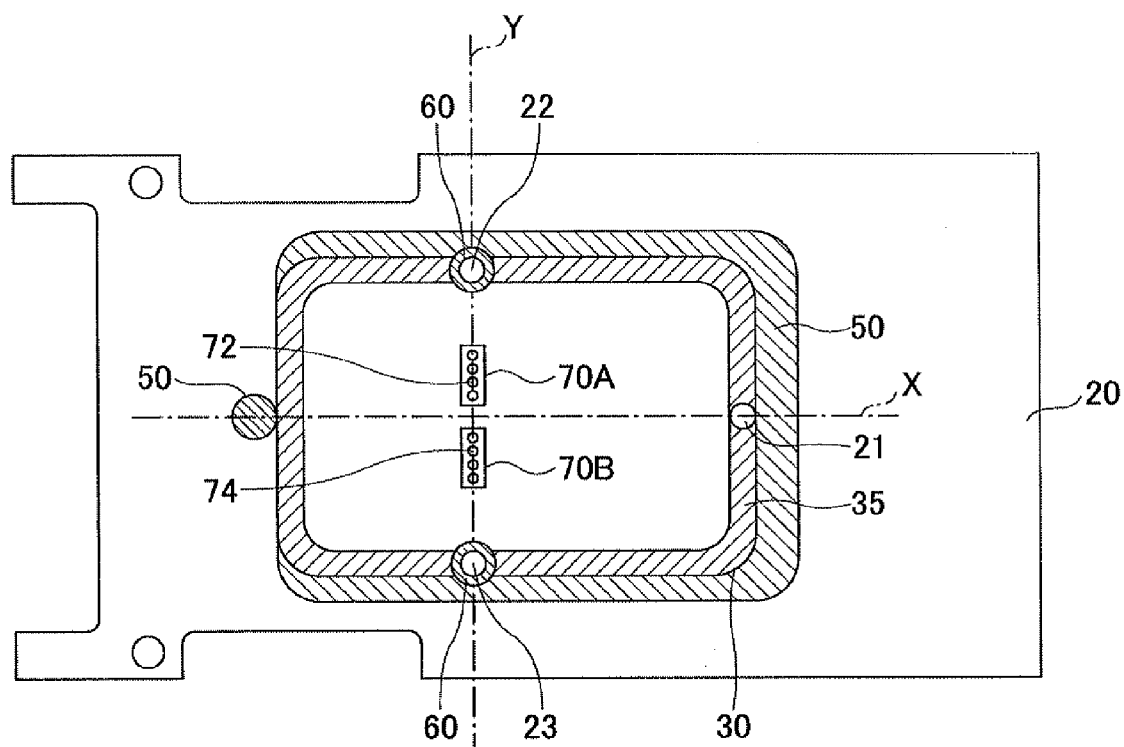
FIG. 9 is a plan view of the printed circuit board with application locations of the two-component mixed adhesive when viewed from above.

FIG. 5 is an exploded perspective view showing the procedure 1 of the mounting configuration 40 of the optical waveguide holding member 30 when viewed obliquely from above. FIG. 6 is an exploded perspective view showing the procedure 1 of the mounting configuration 40 of the optical waveguide holding member 30 when viewed obliquely from below. FIG. 7 is a perspective view in which the optical waveguide holding member 30 is mounted on the printed circuit board 20 (procedure 2). FIG. 8 is a perspective view in which the two-component mixed adhesive 50 is applied to peripheral edges of the optical waveguide holding member 30 mounted on the printed circuit board 20 (procedure 4). FIG. 9 is a plan view of the printed circuit board 20 with application locations of the two-component mixed adhesive 50 when viewed from above.

As illustrated in FIGS. 5 and 6, in the procedure 1, the light curing adhesive 60 is applied to the perimeters of the locating holes 22 and 23 of the printed circuit board 20. The light curing adhesive 60 is, for example, an ultraviolet curing adhesive, which is made of a resin including a prepolymer, a monomer, a photopolymerization initiator and the like and cured by a photopolymerization reaction when exposed to ultraviolet light. The light curing adhesive 60 is easy to use since the curing time after exposure to ultraviolet light is short (several seconds to several tens of seconds) and it is a one-component adhesive.

Subsequently in the procedure 2, the optical waveguide holding member 30 is attached at a predetermined mounting position on the printed circuit board 20 by a motion control operation of the assembly robot, as shown in FIG. 7. At this point, the bosses 33a through 33c on the contact surface 35 are fitted into the locating holes 21 through 23 on the printed circuit board 20, whereby the optical waveguide holding member 30 is attached to the printed circuit board 20 at the predetermined position.

Next in the procedure 3, ultraviolet light is irradiated onto the light curing adhesive 60, whereby the two points on the lateral sides of the optical waveguide holding member 30 are temporarily joined to the locating holes 22 and 23 on the printed circuit board 20. Accordingly, the optical waveguide holding member 30 is temporarily joined in such a manner as to secure the relative position of the lens unit 36A and the photo-electric conversion device 70A and the relative position of the lens unit 36B and the electric-photo conversion device 70B. Therefore, even if an external force is applied before the final fixation, no change would be made in these relative positions.

Subsequently in the procedure 4, as illustrated in FIGS. 8 and 9, the two-component mixture adhesive 50 is applied to three peripheral edges on the left and right lateral sides and the back face side among peripheral edges of the contact surface 35 of the optical waveguide holding member 30, which has been temporarily joined to the printed circuit board 20 at the predetermined mounting position due to the hardening of the light curing adhesive 60. The two-component mixed adhesive 50 is also applied, on the printed circuit board 20, along the outside of the three peripheral edges of the contact surface 35 of the optical waveguide holding member 30.

In addition, a drop of the two-component mixed adhesive 50 is applied, within the periphery of the contact surface 35 of the optical waveguide holding member 30, at a point in the center of the front peripheral edge (on the X axis). The two-component mixed adhesive 30 is hardened by mixing a curing agent with a base made of epoxy resin, and has firmer adhesion compared to the light curing adhesive 60.

Next in the procedure 5, the two-component mixed adhesive 50 applied to the peripheral edges of the optical waveguide holding member 30 in the above-described manner is hardened. Accordingly, the optical waveguide holding member 30 is bonded to the printed circuit board 20 with the hardening of the two-component mixed adhesive 50. The hardening of the two-component mixed adhesive 50 is performed at ambient temperatures. Note that it takes, for example, a few minutes for the two-component mixed adhesive 50 to harden at a room temperature of 25° C. Therefore, the temporary joint with the light curing adhesive 60 in the previous procedure is necessary. The temporary joint allows the optical waveguide holding member 30 to be fixed to the printed circuit board 20 so that the relative position of the lens unit 36A and the photo-electric conversion device 70A and the relative position of the lens unit 36B and the electric-photo conversion device 70B do not change while the two-component mixed adhesive 50 hardens.

Although the two-component mixed adhesive 50 is applied to only one point (on the X axis) on the front peripheral edge, it is applied to the entire extent of the remaining three peripheral edges, and therefore, the optical waveguide holding member 30 is firmly fixed to the printed circuit board 20. Accordingly, it is possible to maintain the relative position of the lens unit 36A and the photo-electric conversion device 70A and the relative position of the lens unit 36B and the electric-photo conversion device 70B against stress caused by the difference in thermal expansion between the optical waveguide holding member 30 and the printed circuit board 20. If the stress due to the difference in thermal expansion becomes excessive, the optical waveguide holding member 30 expands toward the direction of the front peripheral edge having weak adhesion in order to release the stress while the bonded three peripheral edges prevent the optical waveguide holding member 30 from detaching from the printed circuit board 20 due to the thermal expansion.

(b) Second Embodiment

Figure 10:
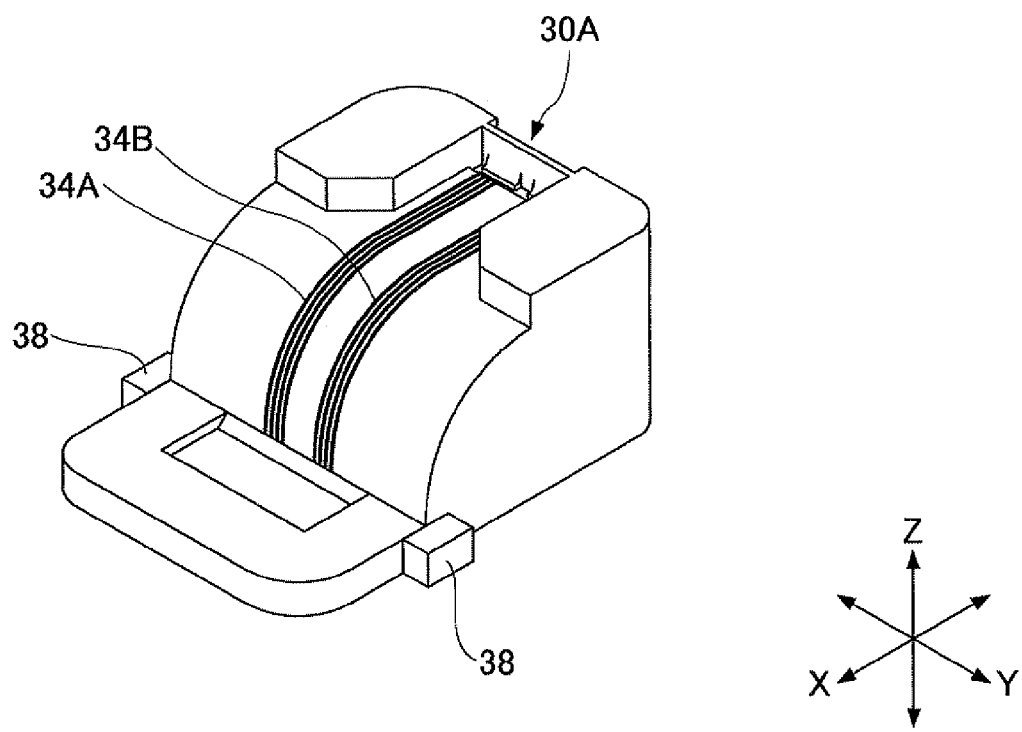
FIG. 10 is a perspective view of an optical waveguide holding member of the second embodiment viewed from above.
Figure 11:
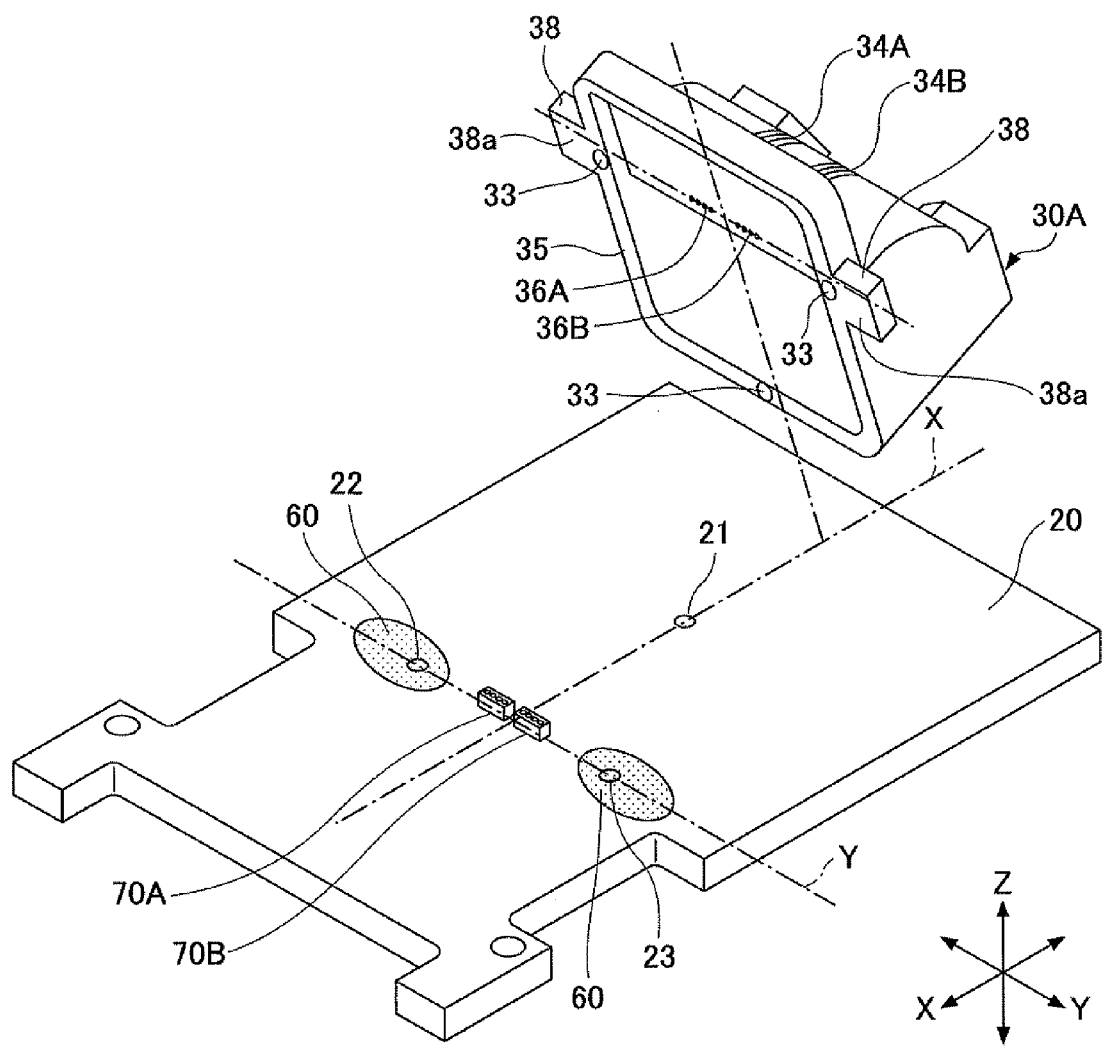
FIG. 11 is an exploded perspective view showing the printed circuit board and the shape of a contact surface of the optical waveguide holding member.
Figure 12:
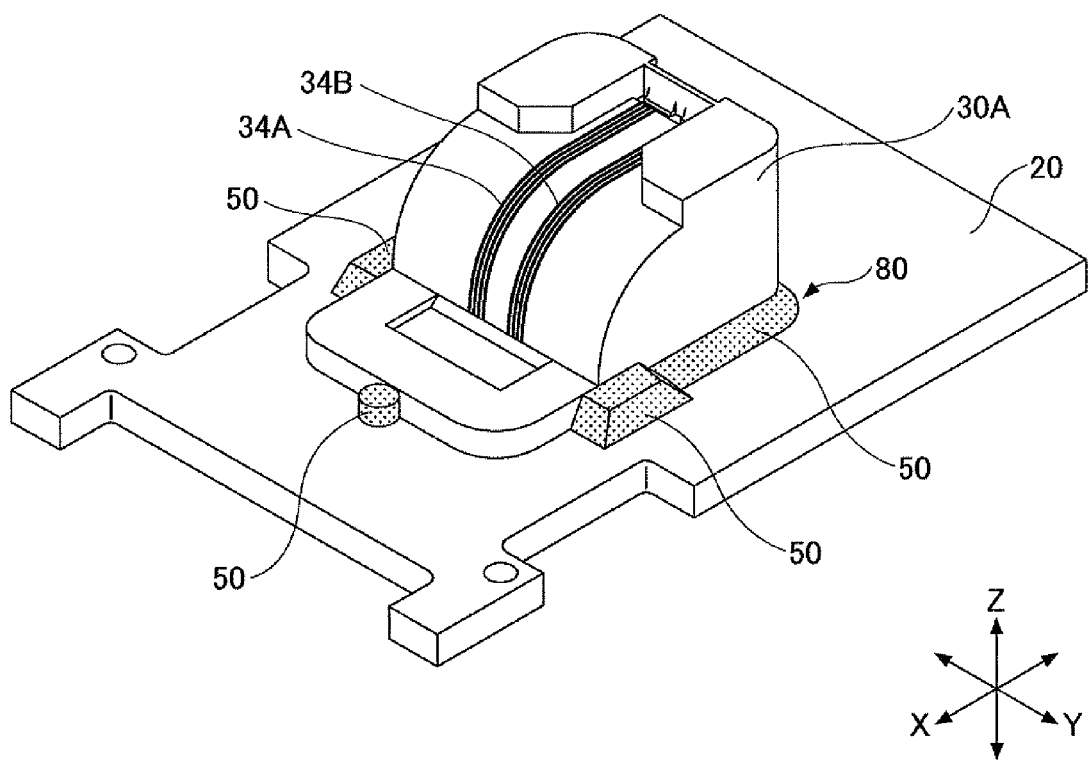
FIG. 12 is a perspective view showing an optical transceiver using a mounting configuration of the second embodiment.

FIG. 10 is a perspective view of an optical waveguide holding member 30A of the second embodiment viewed from above. FIG. 11 is an exploded perspective view showing the printed circuit board 20 and the shape of the contact surface of the optical waveguide holding member 30A. FIG. 12 is a perspective view showing an optical transceiver 10A using a mounting configuration 80 of the second embodiment. Note that, in FIGS. 10 through 12, the same reference numerals are given to the components which are common to those in the first embodiment, and their explanations are omitted.

As illustrated in FIG. 10, in the optical waveguide holding member 30A, a pair of projecting portions 38 that laterally protrudes from the lateral sides of the bottom is integrally formed. The mounting configuration 80 (see FIG. 12) of the second embodiment has a structure in which the paired projecting portions 38 are added to the above-described mounting configuration 40 of the first embodiment.

The projecting portions 38 project in the Y direction in which the paired lens units 36A and 36B are disposed. Undersurfaces 38a of the projecting portions 38 are in the same plane with the contact surface 35 on the bottom face of the optical waveguide holding member 30A in order to form a continuous flat surface. Note that the procedures for achieving the mounting configuration 80 of the second embodiment are the same as the procedures 1 through 5 for achieving the mounting configuration 40 of the first embodiment described above.

As shown in FIG. 11, in the procedure 1, the light curing adhesive 60 is applied to the perimeters of the locating holes 22 and 23 of the printed circuit board 20 as well as to regions on the upper surface of the printed circuit board 20, with which the undersurfaces 38a of the projecting portions 38 are to be in contact.

In the mounting configuration 80 of the second embodiment, after the light curing adhesive 60 hardens, the two-component mixed adhesive 50 is applied in the same manner as in the procedure 4 described above, as illustrated in FIG. 12. That is, the two-component mixed adhesive 50 is applied to the three peripheral edges on the left and right lateral sides and the back face side among the peripheral edges of the contact surface 35 of the optical waveguide holding member 30, which has been temporarily joined to the printed circuit board 20 at the predetermined mounting position due to the hardening of the light curing adhesive 60. In addition, the two-component mixed adhesive 50 is also applied around the projecting portions 38. Furthermore, a drop of the two-component mixed adhesive 50 is applied at a point in the center of the front peripheral edge (on the X axis) of the optical waveguide holding member 30A.

Thus, according to the mounting configuration 80 of the optical transceiver 10A, the two-component mixed adhesive 50 is applied to the entire extent of the three peripheral edges and the peripheries of the projecting portions 38. As a result, the optical waveguide holding member 30A is further firmly fixed to the printed circuit board 20. This prevents changes in the relative position of the lens unit 36A and the photo-electric conversion device 70A and the relative position of the lens unit 36B and the electric-photo conversion device 70B, which otherwise would be caused due to difference in thermal expansion between the optical waveguide holding member 30A and the printed circuit board 20. In this manner, it is possible to maintain the relative positions.

(c) Third Embodiment

Figure 13:
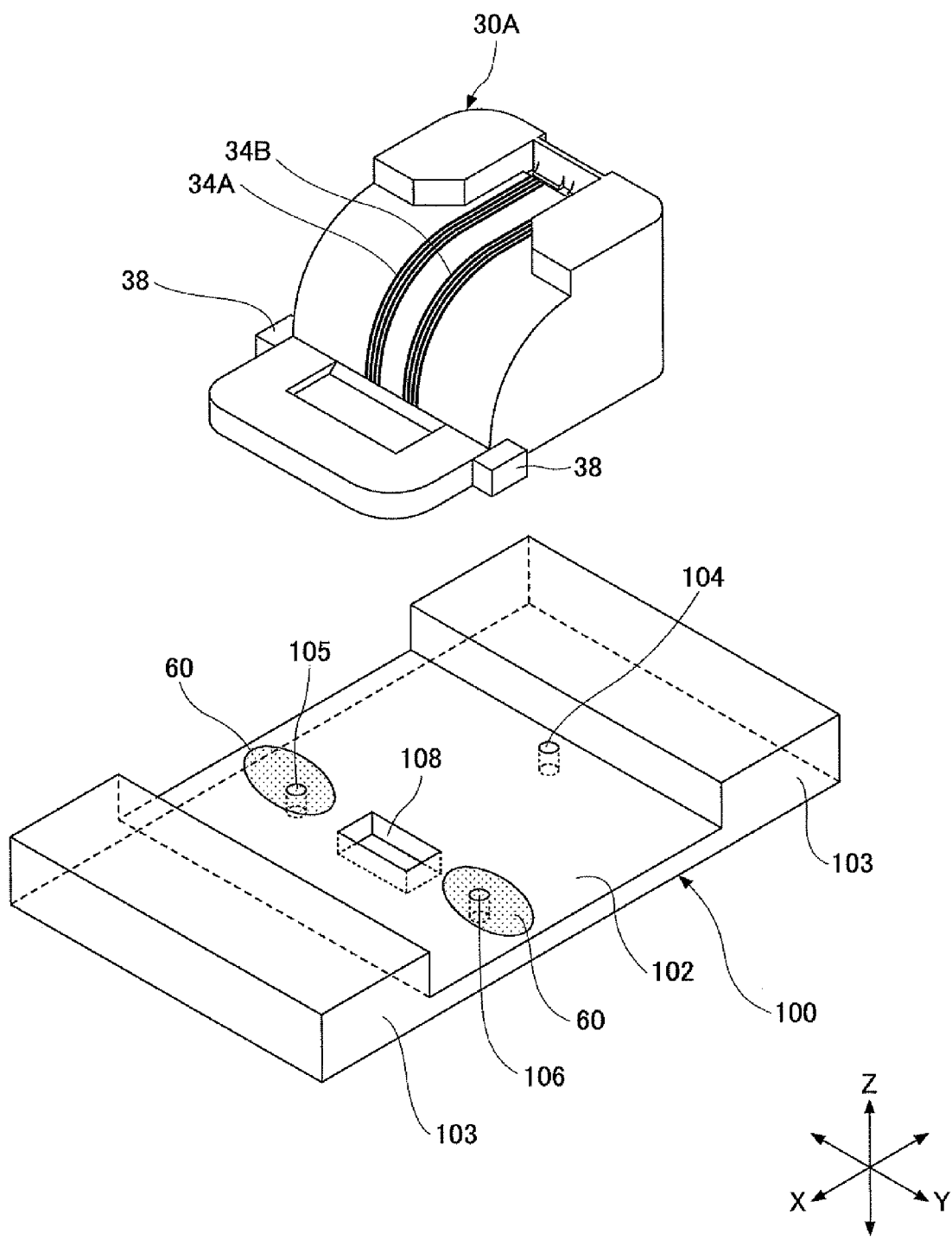
FIG. 13 is an exploded perspective view illustrating a mounting configuration of the third embodiment.
Figure 14:
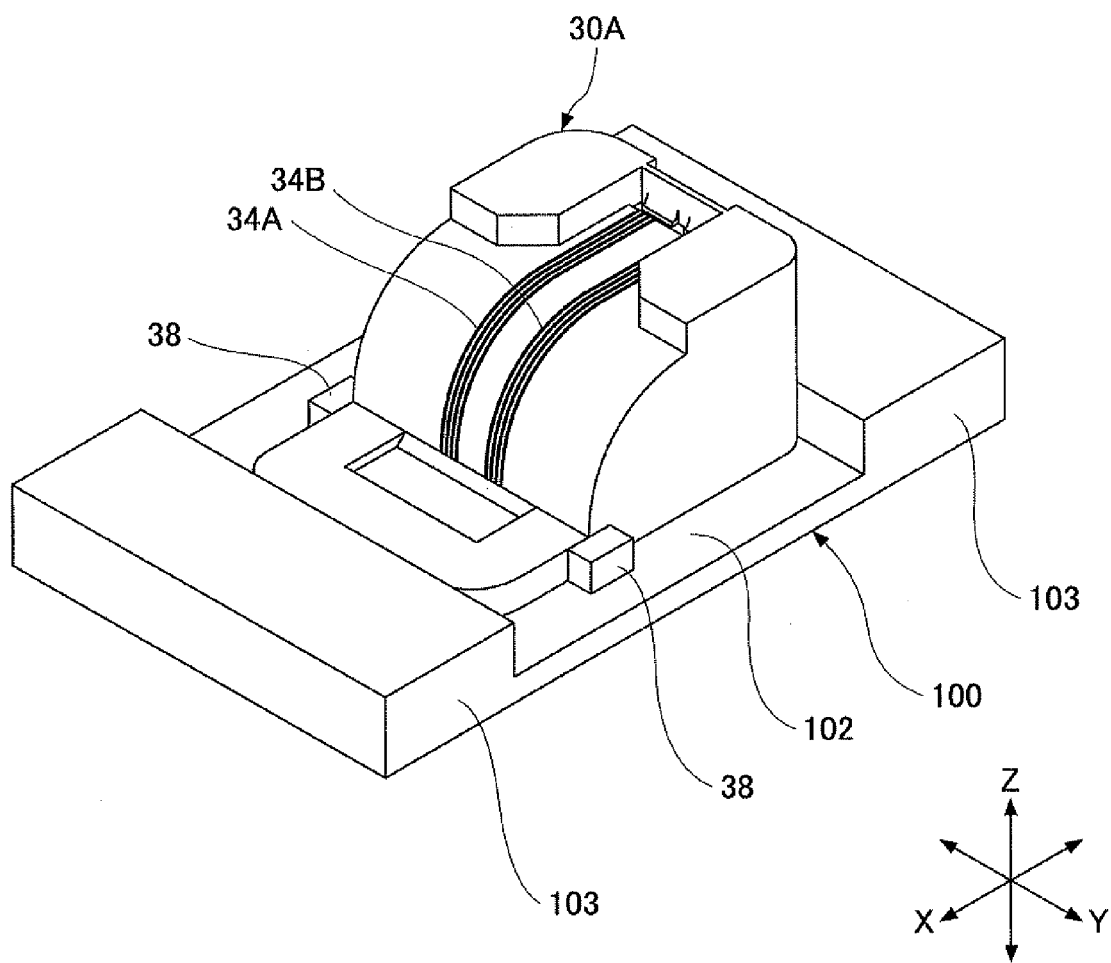
FIG. 14 is a perspective view showing a first stage of an adhesion process, in which the optical waveguide holding member is disposed and fixed to an adherend plate.
Figure 15:
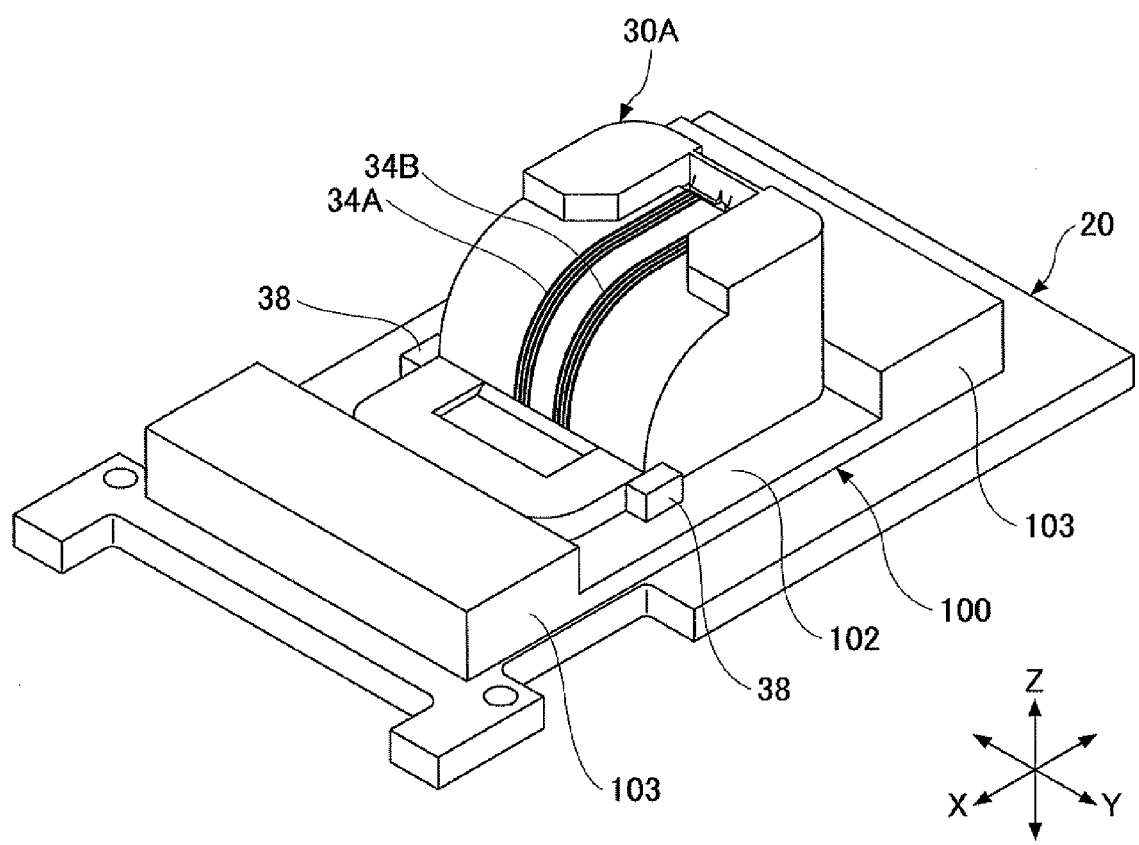
FIG. 15 is a perspective view showing a second stage of the adhesion process, in which the adherend plate is disposed and fixed to the printed circuit board.
Figure 16:
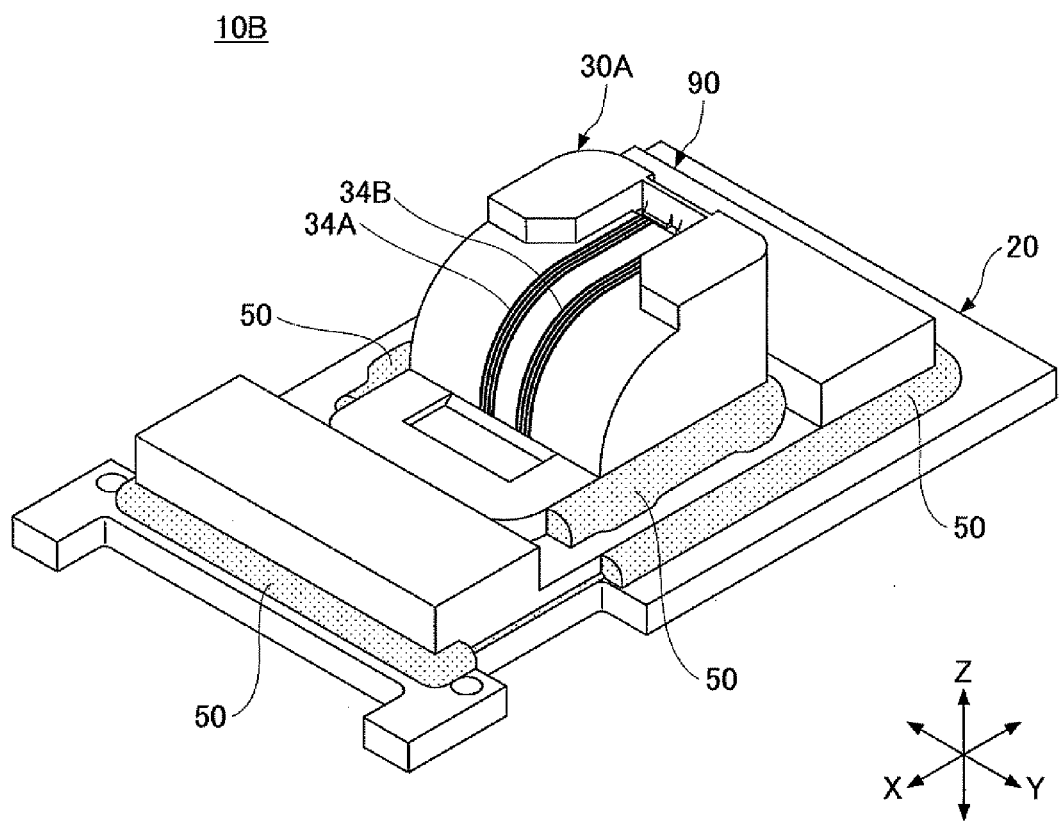
FIG. 16 is a perspective view in which the two-component mixed adhesive is applied to peripheral edges of the optical waveguide holding member and the adherend plate.

FIG. 13 is an exploded perspective view illustrating a mounting configuration 90 of the third embodiment. FIG. 14 is a perspective view showing a first stage of an adhesion process, in which the optical waveguide holding member 30A is disposed and fixed to an adherend plate 100. FIG. 15 is a perspective view showing a second stage of the adhesion process, in which the adherend plate 100 is disposed and fixed to the printed circuit board 20. FIG. 16 is a perspective view in which the two-component mixed adhesive 50 is applied to peripheral edges of the optical waveguide holding member 30A and the adherend plate 100.

As shown in FIG. 13, the mounting configuration 90 has a structure in which the optical waveguide holding member 30A is disposed and fixed to the adherend plate 100, which is then bonded to the printed circuit board 20.

The adherend plate 100 is made of a metallic material, for example, stainless steel, and tends to be easily bonded to the printed circuit board 20 compared to the optical waveguide holding member 30A made of olefinic resin. In the case where the adherend plate 100 is made of stainless steel, it has a linear expansion coefficient of $17.3 \times 10^{-6}/°$ C.

The optical waveguide holding member 30A made of olefinic resin has a linear expansion coefficient of $70 \times 10^{-6}/°$ C. and the printed circuit board 20 made of glass epoxy resin has a linear expansion coefficient of $13 \times 10^{-6}/°$ C. Therefore, by interposing the adherend plate 100 between the printed circuit board 20 and the optical waveguide holding member 30A, it is possible to reduce the stress caused by the difference in thermal expansion between the optical waveguide holding member 30A and the printed circuit board 20.

The adherend plate 100 includes a mounting surface 102 on which the optical waveguide holding member 30A is to be disposed and fixed and a pair of reinforcing parts 103 provided in the front and back of the mounting surface 102. The mounting surface 102 is formed small in thickness in the height direction (i.e. the Z direction), for example, 1 mm or less. On the other hand, each reinforcing part 103 has a thickness of, for example, 1 mm or more in the height direction.

On the mounting surface 102, locating holes 104 through 106 are provided, into which the bosses 33 protruding from the bottom face of the optical waveguide holding member 30A are to be fitted. In addition, a pass-through opening 108 for passing optical signals is provided between the locating holes 105 and 106, at a position corresponding to the lens units 36A and 36B formed on the bottom face of the optical waveguide holding member 30A.

Next are described the assembly procedures with reference to FIGS. 14 and 15.

First, in the procedure 1, the light curing adhesive 60 is applied to the perimeters of the locating holes 105 and 106 on the adherend plate 100 and regions, on the mounting surface 102, with which the undersurfaces 38a of the projecting portions 38 are to be in contact, as shown in FIG. 13.

Next in the procedure 2, as illustrated in FIG. 14, the optical waveguide holding member 30A is attached to the mounting surface 102 of the adherend plate 100 by a motion control operation of the assembly robot. At this point, the bosses 33 are fitted into the locating holes 104 through 106 of the adherend plate 100, whereby the optical waveguide holding member 30A is attached to a specified position.

Subsequently in the procedure 3, ultraviolet light is irradiated onto the light curing adhesive 60, whereby the two points on the lateral sides of the optical waveguide holding member 30A are fixed to the mounting surface 102 of the adherend plate 100. Accordingly, the optical waveguide holding member 30A is fixed in such a manner as to maintain the relative position of the lens unit 36A and the photo-electric conversion device 70A and the relative position of the lens unit 36B and the electric-photo conversion device 70B.

Next in the procedure 4, the adherend plate 100 on which the optical waveguide holding member 30A has been mounted is attached to the printed circuit board 20, as shown in FIG. 15. Instead of providing the locating holes 21 through 23 on the printed circuit board 20, bosses to be fitted into the locating holes 104 through 106 from the undersurface side of the adherend plate 100 are provided on the printed circuit board 20 (hidden in FIG. 15). Then, a thermosetting adhesive, for example, is applied to the perimeters of the locating holes 104 through 106, and the adherend plate 100 is temporarily joined to the printed circuit board 20.

Being made of a metal, such as stainless steel, the adherend plate 100 allows the adhesive to have stronger chemical bonding with the optical waveguide holding member 30A made of olefinic resin, compared to the case of the printed circuit board 20. As a result, the adherend plate 100 firmly holds the optical waveguide holding member 30A.

Subsequently in the procedure 5, the two-component mixed adhesive 50 is applied to the entire peripheral edges of the adherend plate 100 which has been temporarily joined to the printed circuit board 20 at the predetermined mounting position, as illustrated in FIG. 16. Accordingly, the adherend plate 100 is firmly fixed to the printed circuit board 20.

Next, the two-component mixed adhesive 50 is applied to peripheral edges in only three directions among the peripheral edges of the contact surface 35 of the optical waveguide holding member 30A, which has been temporarily joined at the predetermined mounting position of the adherend plate 100. Specifically, the two-component mixed adhesive 50 is applied to the peripheral edges on the left and right lateral sides, the peripheral edges around the projecting portions 38 which laterally project, and the peripheral edge on the back face side.

Subsequently in the procedure 6, the two-component mixed adhesive 50 applied to the peripheral edges of the optical waveguide holding member 30A and the entire peripheral edges of the adherend plate 100 in the above-described manner is hardened. The hardening of the two-component mixed adhesive 50 is performed at ambient temperatures. In this way, the optical transceiver 10B is completed.

Thus, according to the mounting configuration 90 of the third embodiment, the adherend plate 100 allows the adhesive to have stronger chemical bonding with the optical waveguide holding member 30A and the printed circuit board 20. Therefore, the adhesive strength increases compared to the case where the optical waveguide holding member 30A is bonded directly to the printed circuit board 20. Thus, by interposing the adherend plate 100, it is possible to firmly fix the optical waveguide holding member 30A to the printed circuit board 20.

In addition, the contact surface area of the adherend plate 100 is larger than the area of the contact surface 35 of the optical waveguide holding member 30A, which also contributes to an increase in the adhesive strength to the printed circuit board 20.

Figure 17:
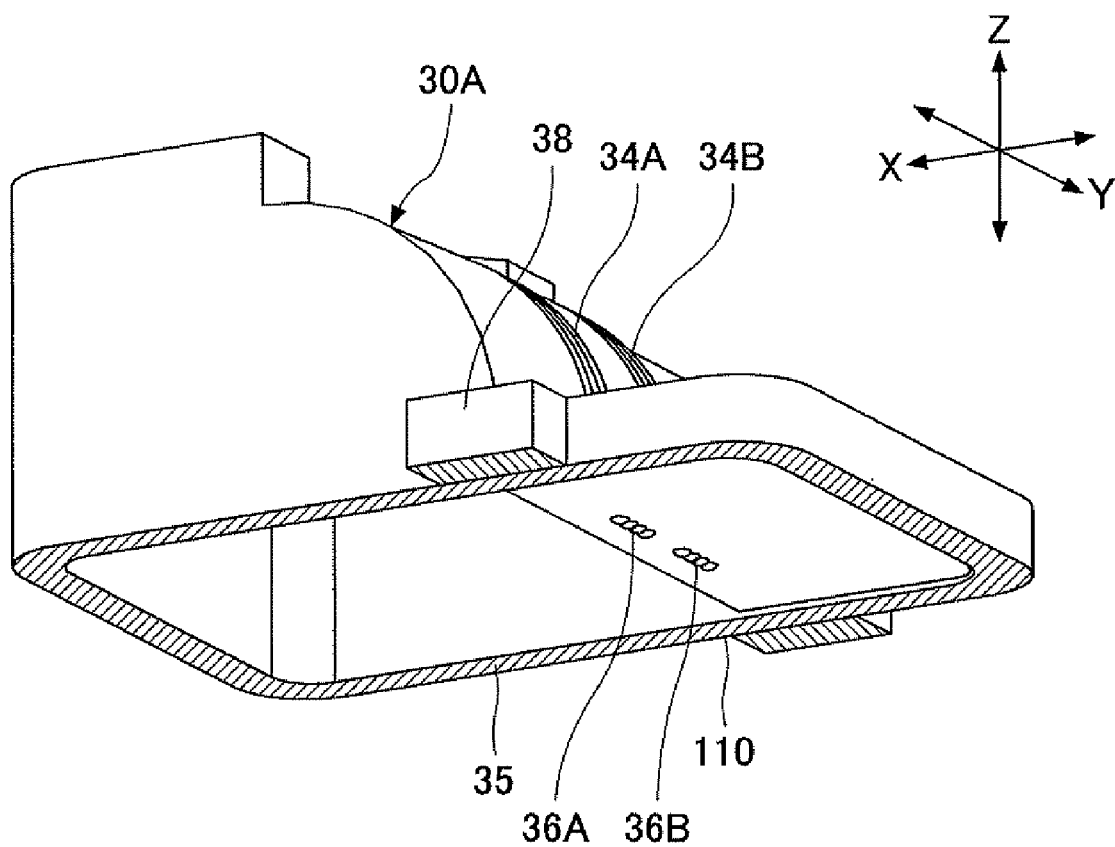
FIG. 17 is a perspective view showing a modification of the third embodiment.

FIG. 17 is a perspective view showing a modification of the third embodiment. As illustrated in FIG. 17, the entire contact surface 35 on the bottom face of the optical waveguide holding member 30A is subjected to a roughening treatment, and a resin layer or a thin film metal layer, which serves as a coating layer 110, is laid on top of the roughened contact surface 35. The coating layer 110 is an alternative to the adherend plate 100, and is formed by plating using epoxy resin or a metal, such as Cu or Ni, which allows the adhesive to have strong chemical bonding.

The coating layer 110 is brought in contact with the printed circuit board 20, and fixed to the printed circuit board 20 by application of the two-component mixed adhesive 50 to the peripheral edges of the coating layer 110. Thus, the coating layer 110 increases the strength of the chemical bonding of the adhesive to the optical waveguide holding member 30A and the printed circuit board 20, whereby it is possible to firmly fix the optical waveguide holding member 30A to the printed circuit board 20.

In addition, according to the mounting configuration of the present modification, the coating layer 110 is as thin as several tens of micrometers in thickness. Therefore, the appearance of the mounting configuration is no different from that of the mounting configuration of the first or second embodiment; however, the adhesive strength increases compared to the case where the optical waveguide holding member 30A is bonded directly to the printed circuit board 20.

Note that the procedures of the adhesion process of the present modification are the same as those of the first and second embodiments described above, and the description is therefore omitted.

(d) Fourth Embodiment

Figure 18:
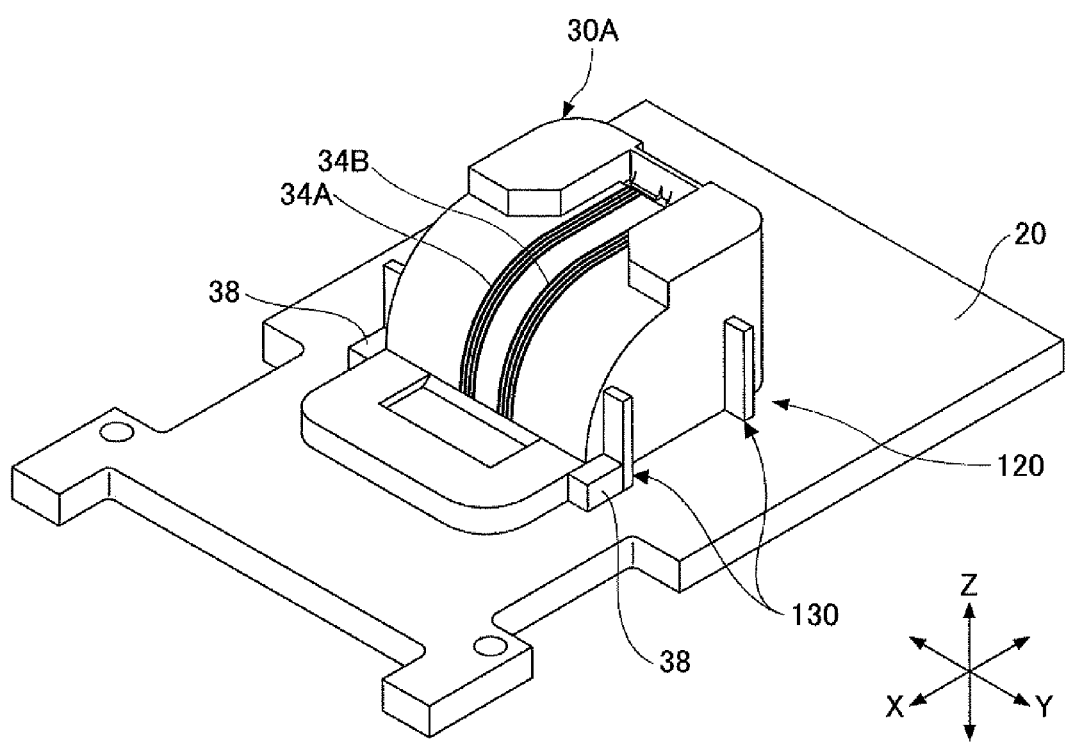
FIG. 18 is a perspective view of a mounting configuration of the fourth embodiment before application of the adhesive.
Figure 19:
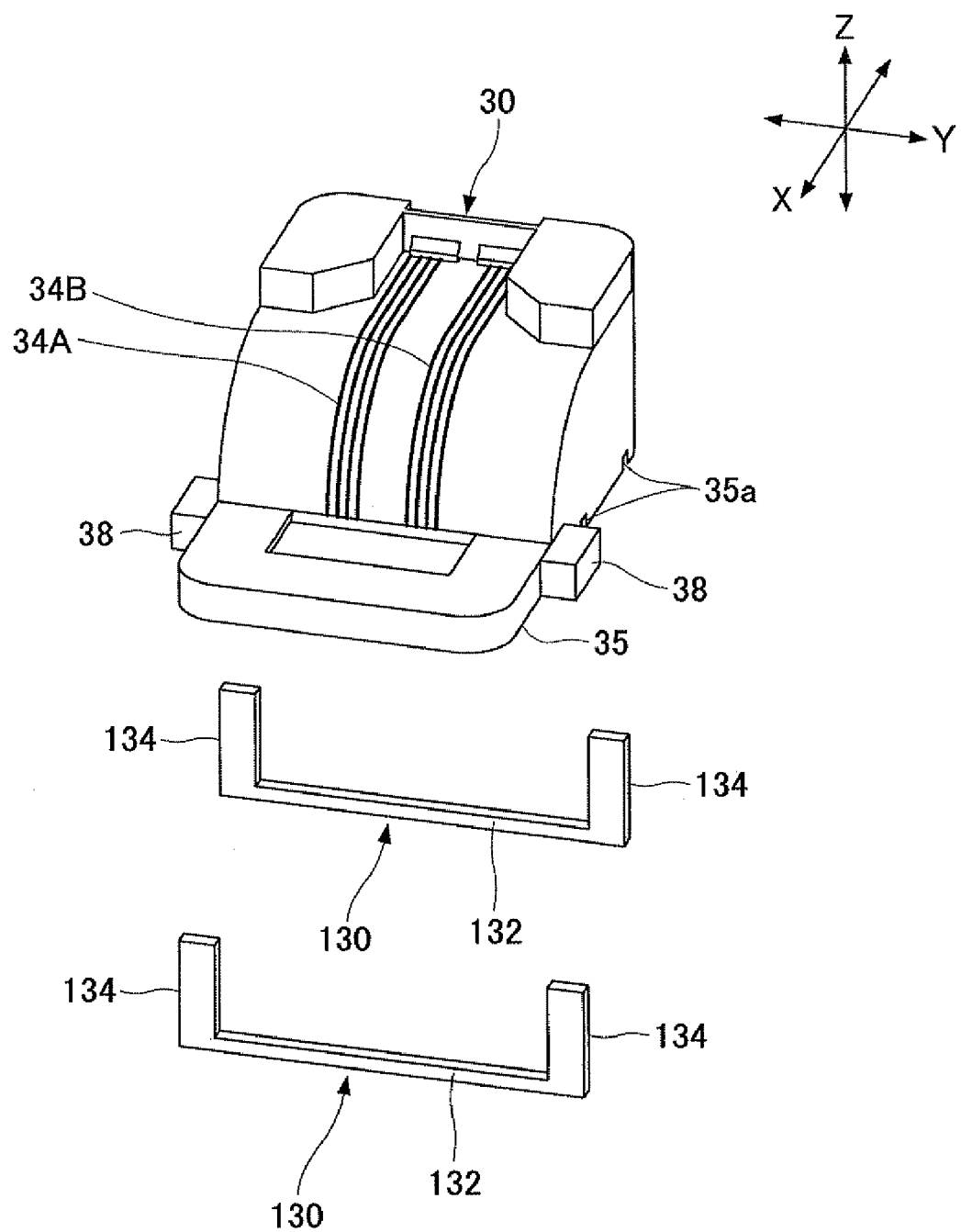
FIG. 19 is an exploded perspective view showing the optical waveguide holding member and reinforcing members.
Figure 20:
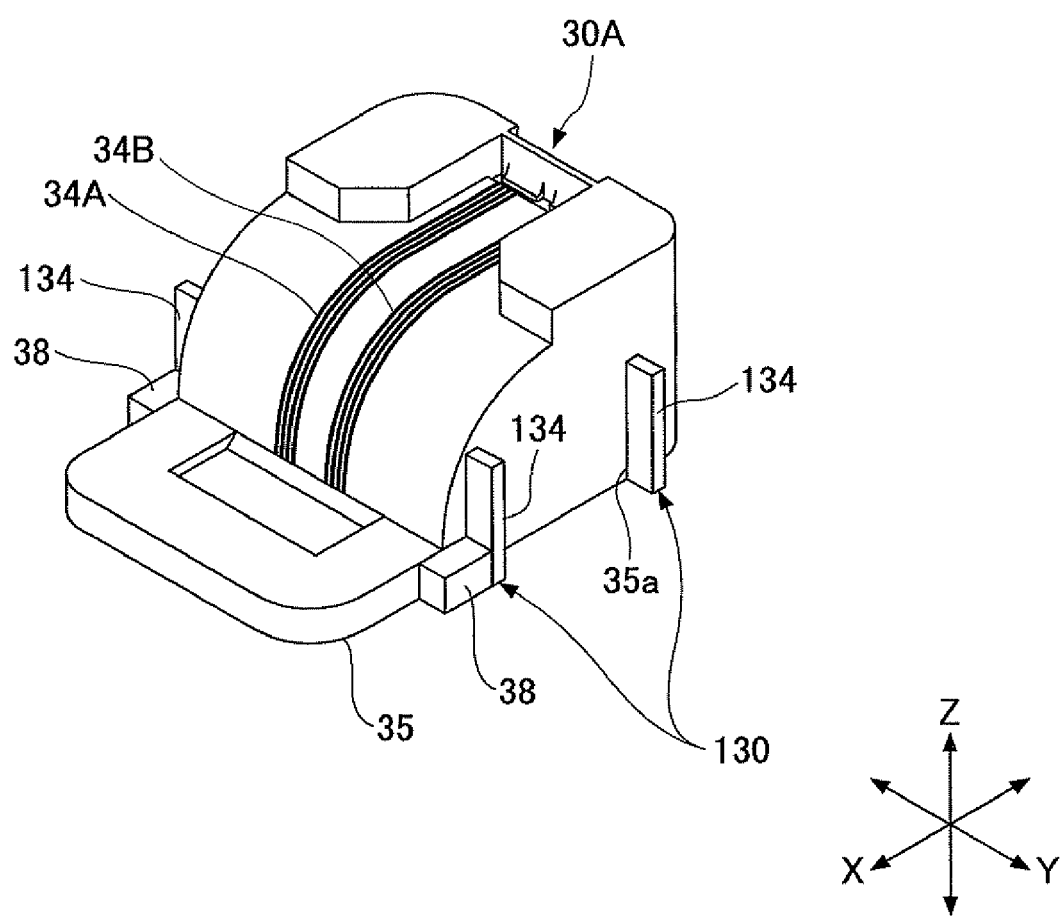
FIG. 20 is a perspective view showing the optical waveguide holding member to which the reinforcing members are fitted.
Figure 21:
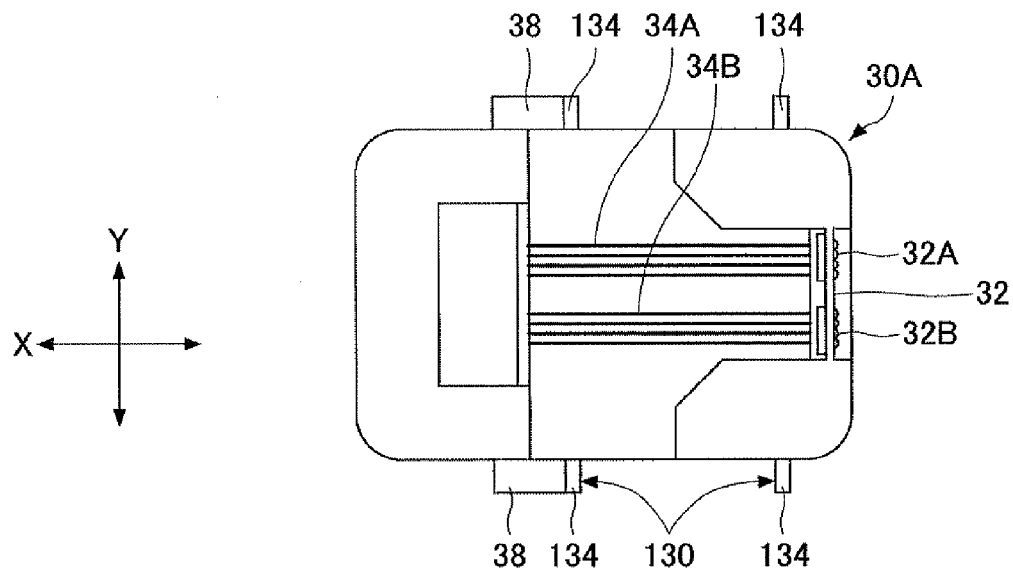
FIG. 21 is a plan view of the optical waveguide holding member with the reinforcing members fitted, viewed from above.
Figure 22:
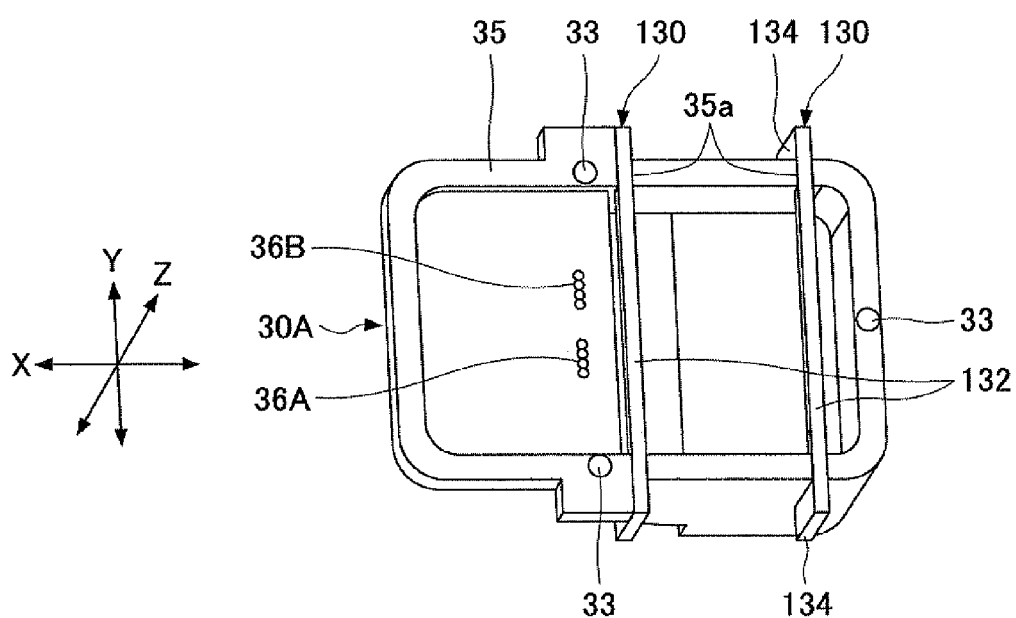
FIG. 22 is a bottom plan view of the optical waveguide holding member, to which the reinforcing members are fitted.
Figure 23:
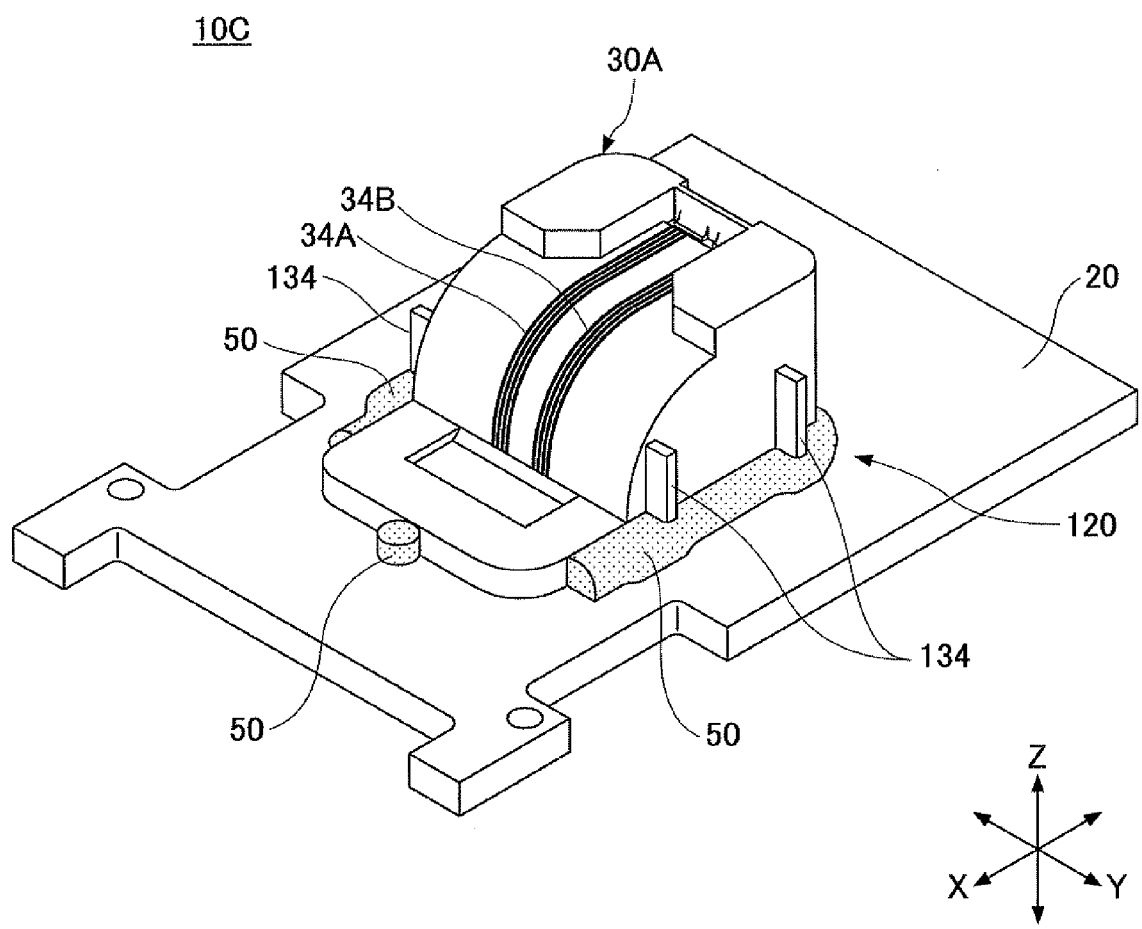
FIG. 23 is a perspective view of the mounting configuration to which the adhesive is applied.

FIG. 18 is a perspective view of a mounting configuration 120 of the fourth embodiment before application of the adhesive. FIG. 19 is an exploded perspective view showing the optical waveguide holding member 30A and reinforcing members 130. FIG. 20 is a perspective view showing the optical waveguide holding member 30A to which the reinforcing members 130 are fitted. FIG. 21 is a plan view of the optical waveguide holding member 30A with the reinforcing members 130 fitted, viewed from above. FIG. 22 is a bottom plan view of the optical waveguide holding member 30A, to which the reinforcing members 130 are fitted. FIG. 23 is a perspective view of the mounting configuration 120 to which the adhesive is applied.

As illustrated in FIG. 18, in achieving the mounting configuration 120 of the fourth embodiment, a pair of reinforcing members 130 is fitted to the bottom of the optical waveguide holding member 30A.

The reinforcing members 130 are made of a metal material, for example, stainless or the like, and each has the shape of a square bracket, as illustrated in FIG. 19. Each reinforcing member 130 includes a beam 132 which is fitted into a depression 35a formed on the contact surface 35 of the optical waveguide holding member 30A and laid across in the lateral direction (Y direction); and a pair of columns 134 rising upward from the ends of the beam 132.

As shown in FIG. 20, when each beam 132 of the paired reinforcing members 130 is fitted into one of the depressions 35a provided on the bottom face of the optical waveguide holding member 30A, the paired columns 134 hold together the left and right lateral sides of the optical waveguide holding member 30A. The paired reinforcing members 130 are fitted into the depressions 35a, and then, the reinforcing members 130 are fixed to the optical waveguide holding member 30A with an adhesive. Alternatively, when the optical waveguide holding member 30A is formed, the paired reinforcing members 130 may be produced by insert molding.

As illustrated in FIG. 21, if the optical waveguide holding member 30A is viewed from above, the columns 134 of the paired reinforcing members 130 are in contact with the lateral sides of the optical waveguide holding member 30A at four points. Therefore, displacement in the Y direction due to thermal expansion is reduced by the columns 134. In addition, the columns 134 of one reinforcing member 130 are in contact with back faces of the projecting portions 38 which laterally protrude from the optical waveguide holding member 30A, and the paired reinforcing members 130 are disposed in such a manner as not to interfere with the lens units 36A and 36B.

Furthermore, as shown in FIG. 22, on the bottom face of the optical waveguide holding member 30A, the beams 132 of the paired reinforcing members 130 are fitted into the depressions 35a, whereby displacement in the X direction due to thermal expansion is reduced.

Thus, the integrated optical waveguide holding members 30A having the fitted and fixed reinforcing members 130 has increased rigidity due to the paired reinforcing members 130 and allows thermal expansion in the X and Y directions to be reduced.

Subsequently, as in the case of the first and second embodiments, the light curing adhesive 60 is applied to the perimeters of the locating holes 22 and 23 of the printed circuit board 20 as well as to regions on the upper surface of the printed circuit board 20, with which the undersurfaces 38a of the projecting portions 38 are to be in contact.

Next, as shown in FIG. 18, the optical waveguide holding member 30A is disposed on the printed circuit board 20. The bosses 33 on the bottom face are fitted into the locating holes 21 through 23 on the printed circuit board 20, and ultraviolet light is irradiated onto the light curing adhesive 60. Accordingly, the optical waveguide holding member 30A is temporarily joined to the printed circuit board 20.

After the light curing adhesive 60 is hardened, the two-component mixed adhesive 50 is applied to peripheral edges in only three directions among the peripheral edges of the contact surface 35 of the optical waveguide holding member 30A, as shown in FIG. 23. Specifically, the two-component mixed adhesive 50 is applied to the peripheral edges on the left and right lateral sides, the peripheral edges around the projecting portions 38, and the peripheral edge on the back face side. In addition, a drop of the two-component mixed adhesive 50 is applied at a point in the center of the front peripheral edge (on the X axis) of the optical waveguide holding member 30A. According to the application of the two-component mixed adhesive 50 in the above-mentioned manner, the two-component mixed adhesive 50 is supplied from the outside to the ends of the beams 132 and the lower parts of the columns 134 of the paired reinforcing members 130, which are in contact with the printed circuit board 20.

At the same time, the two-component mixed adhesive 50 is supplied also to regions, within the printed circuit board 20, corresponding to the outer sides of the contact surface 35 and the reinforcing members 130 of the optical waveguide holding member 30A. Accordingly, the optical waveguide holding member 30A and the paired reinforcing members 130 are bonded to the printed circuit board 20 with the hardening of the two-component mixed adhesive 50. In this way, an optical transceiver 10C is completed.

Being made of a metal, the paired reinforcing members 130 have stronger chemical bonding with the upper surface of the printed circuit board 20 compared to the optical waveguide holding member 30A. Therefore, according to the mounting configuration 120 of the fourth embodiment, the adhesive strength increases compared to the case where the optical waveguide holding member 30A is bonded directly to the printed circuit board 20. As a result, after the two-component mixed adhesive 50 is hardened, the adhesive strength between the printed circuit board 20 and the reinforcing members 130 is stronger than the adhesive strength between the optical waveguide holding member 30A and the printed circuit board 20. Accordingly, the optical waveguide holding member BOA is firmly bonded to the printed circuit board 20 via the reinforcing members 130, whereby the optical waveguide holding member 30A is unlikely to be displaced. In addition, since the two-component mixed adhesive 50 is applied also to the surfaces of the reinforcing members 130, the adhesive surface area increases compared to the case of the optical waveguide holding member 30A without the reinforcing members 130. Accordingly, the adhesive strength is increased corresponding to the increase in the adhesive surface area due to the reinforcing members 130, which achieves stronger fixation between the optical waveguide holding member 30A and the printed circuit board 20.

As for the method for fitting and fixing the reinforcing members 130 to the contact surface 35 of the optical waveguide holding member 30A, another method other than adhesion and insert molding mentioned above may be used (for examples the reinforcing members 130 may be soldered on the printed circuit board 20, or fixed to the printed circuit board 20 with screws).

Alternatively, the reinforcing members 130 may be fixed to the printed circuit board 20 using a structure in which the beams 132 protrude downward from the contact surface 35 and are fitted into grooves provided on the printed circuit board 20.

As another alternative, the reinforcing members 130 may be insert-molded into the optical waveguide holding member 30A in such a manner that the columns 134 are buried in the left and right lateral sides of the optical waveguide holding member 30A.

(e) Fifth Embodiment

Figure 24:
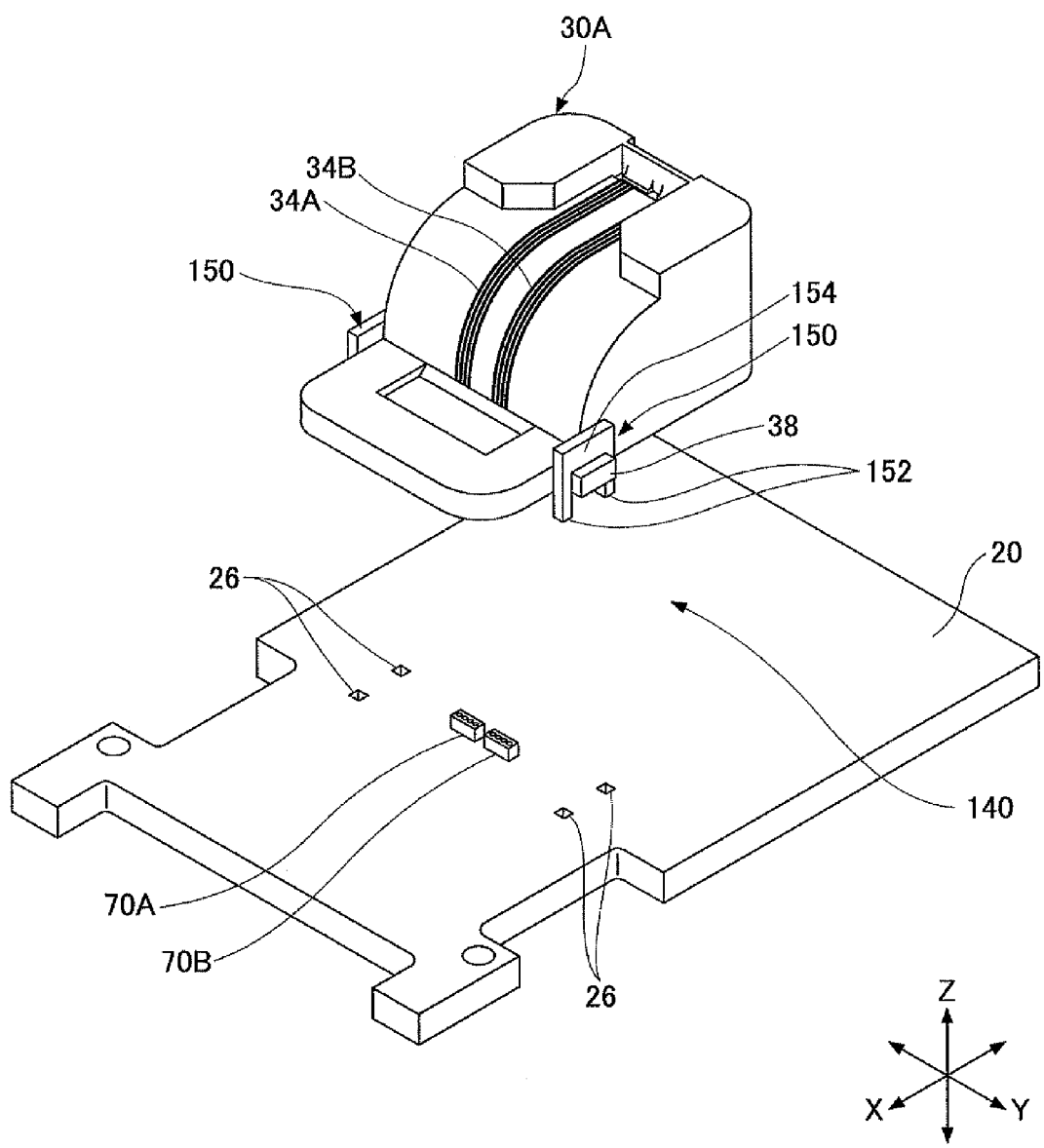
FIG. 24 is an exploded perspective view showing a mounting configuration of the fifth embodiment.
Figure 25:
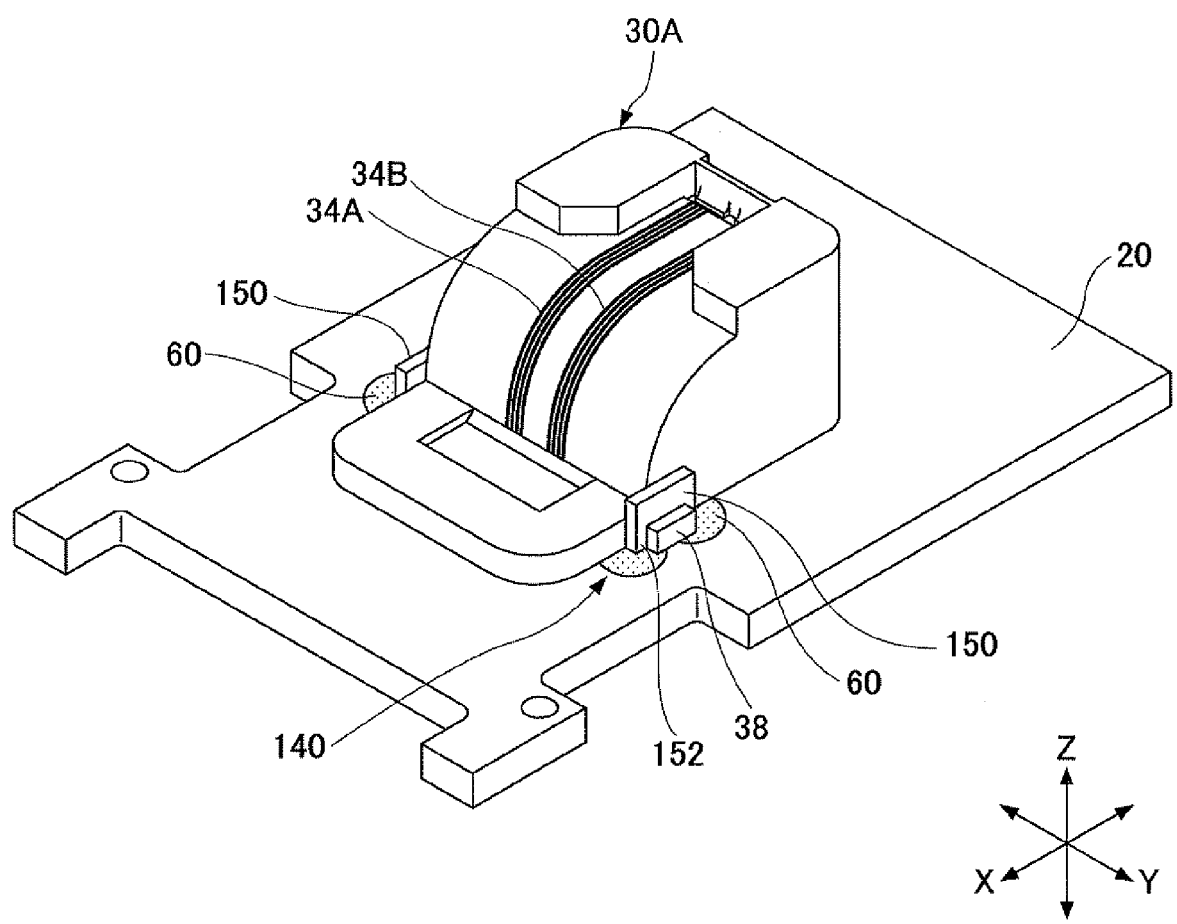
FIG. 25 is a perspective view in which fixing members engage with projecting portions of the optical waveguide holding member, thereby fixing the optical waveguide holding member to the printed circuit board.
Figure 26:
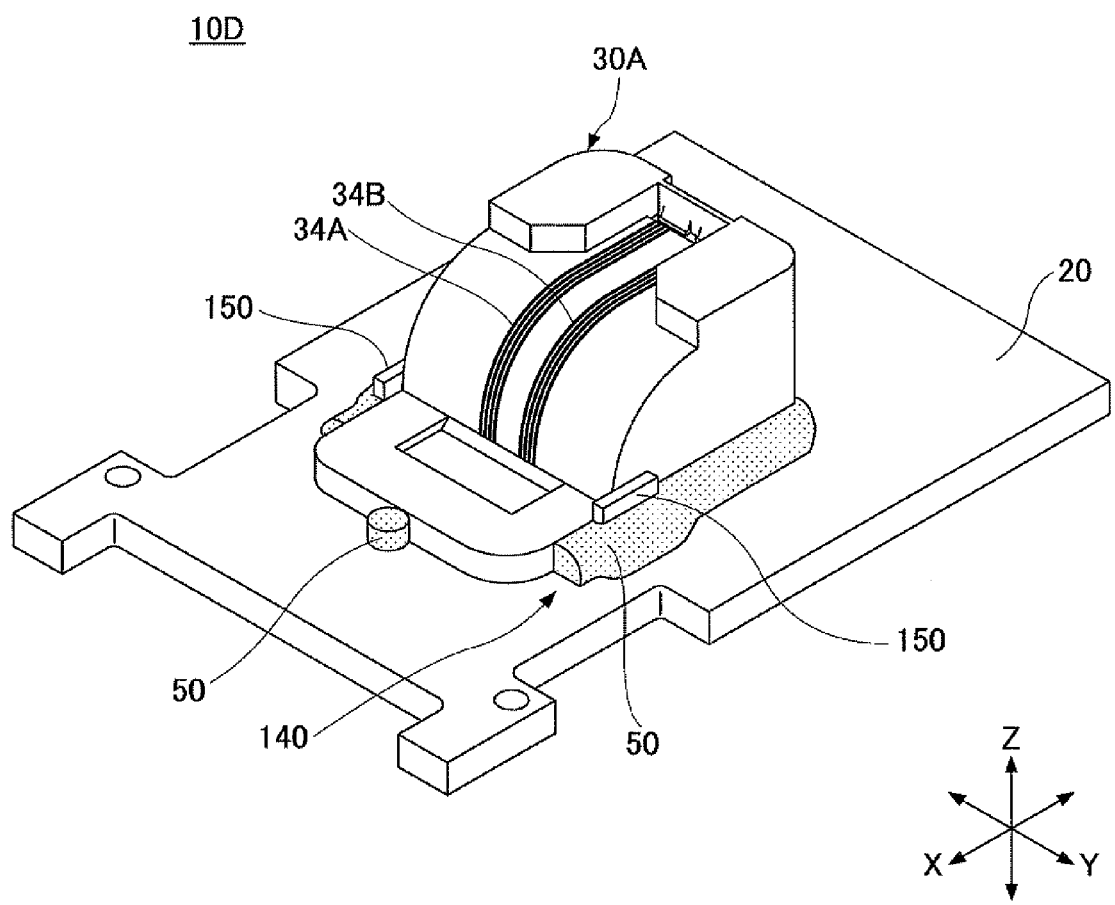
FIG. 26 is a perspective view in which the adhesive is applied to peripheral edges of the optical waveguide holding member and the fixing members.

FIG. 24 is an exploded perspective view showing a mounting configuration 140 of the fifth embodiment. FIG. 25 is a perspective view in which fixing members 150 engage the projecting portions 38 of the optical waveguide holding member 30A, thereby fixing the optical waveguide holding member 30A to the printed circuit board 20. FIG. 26 is a perspective view in which the adhesive is applied to peripheral edges of the optical waveguide holding member 30A and the fixing members 150.

As illustrated in FIG. 24, according to the mounting configuration 140, the fixing members 150 each in the shape of an inverted U are fitted, from the upper side, onto the projecting portions 38 which laterally protrude from the left and right lateral sides of the optical waveguide holding member 30A, and a pair of legs of each fixing member 150 is fitted into mounting holes 26 of the printed circuit board 20.

The fixing members 150 are formed of, for example, a metal or epoxy resin, and each includes the pair of legs 152 to be in contact with the front and back lateral sides of the projecting portion 38 and a hold-down portion 154 to be in contact with the upper side of the projecting portion 38.

On the upper surface of the printed circuit board 20, the mounting holes 26 into which the paired legs 152 are to be fitted are provided in front and back of the contacting regions of the projecting portions 38.

As in the case of the first and second embodiments, the light curing adhesive 60 is applied to the perimeters of the mounting holes 26 on the printed circuit board 20 as well as to regions on the upper surface of the printed circuit board 20, with which the undersurfaces 38a of the projecting portions 38 are to be in contact, as shown in FIG. 25.

Subsequently, the optical waveguide holding member 30A is disposed on the printed circuit board 20, and the bosses 33 on the bottom face are fitted into the printed circuit board 20. Ultraviolet light is irradiated onto the light curing adhesive 60, thereby temporarily joining the optical waveguide holding member 30A to the printed circuit board 20.

After the light curing adhesive 60 is hardened, the two-component mixed adhesive 50 is applied to peripheral edges in only three directions among the peripheral edges of the contact surface 35 of the optical waveguide holding member 30A, as shown in FIG. 26. Specifically, the two-component mixed adhesive 50 is applied to the peripheral edges on the left and right lateral sides, the peripheral edges around the projecting portions 38, and the peripheral edge on the back face side. In addition, a drop of the two-component mixed adhesive 50 is applied at a point in the center of the front peripheral edge (on the X axis) of the optical waveguide holding member 30A. According to the application of the two-component mixed adhesive 50 in the above-mentioned manner, the two-component mixed adhesive 50 is supplied from the outside to the legs 152 and the hold-down portions 154 of the paired fixing members 150.

At the same time, the two-component mixed adhesive 50 is supplied also to regions, within the printed circuit board 20, corresponding to the outer sides of the contact surface 35 and the reinforcing members 130 of the optical waveguide holding member 30A. Accordingly, the optical waveguide holding member 30A and the paired fixing members 150 are bonded to the printed circuit board 20 with the hardening of the two-component mixed adhesive 50. In this way, an optical transceiver 10D is completed.

Being made of a metal or epoxy resin, the paired fixing members 150 have stronger chemical bonding with the upper surface of the printed circuit board 20 compared to the optical waveguide holding member 30A. Therefore, according to the mounting configuration 120 of the fifth embodiment, the adhesive strength increases compared to the case where the optical waveguide holding member 30A is bonded directly to the printed circuit board 20.

As a result, after the two-component mixed adhesive 50 is hardened, the adhesive strength between the printed circuit board 20 and the fixing members 150 is stronger than the adhesive strength between the optical waveguide holding member 30A and the printed circuit board 20. Accordingly, the optical waveguide holding member 30A is firmly bonded to the printed circuit board 20 via the fixing members 150, whereby the optical waveguide holding member 30A is unlikely to be displaced. In addition, since the two-component mixed adhesive 50 is applied also to the surfaces of the fixing members 150, the adhesive surface area increases compared to the case of the optical waveguide holding member 30A without the fixing members 150. Accordingly, the adhesive strength is increased corresponding to the increase in the adhesive surface area due to the fixing members 150, which achieves stronger fixation between the optical waveguide holding member 30A and the printed circuit board 20.

In summary, according to one aspect of the present invention, within the contact surface of the optical waveguide holding member to be in contact with the printed circuit board, a part close to the lens unit is bonded by the light curing adhesive to the printed circuit board. Accordingly, it is possible to effectively prevent displacement of the lens unit after the optical waveguide holding member is temporarily joined to a predetermined mounting position on the printed circuit board. Subsequently, among peripheral edges of the contact surface, peripheral edges disposed on lateral sides of the lens unit and a peripheral edge close to the back face are bonded by the two-component mixed adhesive to the printed circuit board. Accordingly, it is possible to firmly fix the optical waveguide holding member to the printed circuit board in a manner that stress caused by thermal expansion is unlikely to have an influence on the lens unit and an incident portion provided on the connection surface. This results in a reduction in the relative positional misalignment between the lens unit of the optical waveguide holding member and the photoelectric conversion device disposed on the printed circuit board.

This patent application is based on Japanese Priority Patent Application No. 2008-156569 filed on Jun. 16, 2008, the entire contents of which are hereby incorporated herein by reference.

What is claimed is:

1. An article of manufacture of an optical waveguide holding member made of a resin material and including a contact surface on a bottom face thereof, which is to be in contact with a printed circuit board; a connection surface on a back face thereof, to which an optical fiber is to be connected; an optical waveguide disposed along a curved surface and connecting the contact surface and the connection surface; and a lens unit disposed at an end of the optical waveguide,
  wherein a light curing adhesive is applied to part of the contact surface which part is adjacent to the lens unit so that the part of the contact surface is bonded to the printed circuit board, and
  a two-component mixed adhesive is applied to, along peripheries of the contact surface in contact with the printed circuit board, outer edges of lateral-side peripheries of the contact surface which lateral-side peripheries are adjacent to the lens unit and an outer edge of a back-side periphery of the contact surface which back-side periphery is close to the back face so that the lateral-side peripheries and the back-side periphery of the contact surface are bonded to the printed circuit board.

2. The article of manufacture of the optical waveguide holding member as claimed in claim 1, wherein among the peripheral edges of the contact surface, a front peripheral edge opposing the peripheral edge close to the back face is partially bonded by the two-component mixed adhesive to the printed circuit board.

3. The article of manufacture of the optical waveguide holding member as claimed in claim 1, wherein bosses to be fitted into mounting holes provided on the printed circuit board are disposed, within the peripheral edges on the lateral sides of the lens unit, at positions laterally corresponding to the lens unit, and the bosses are bonded into the mounting holes.

4. The article of manufacture of the optical waveguide holding member as claimed in claim 1, wherein projecting portions are disposed in such a manner as to laterally protrude from the peripheral edges on the lateral sides of the lens unit at positions laterally corresponding to the lens unit, and the light curing adhesive is applied to a plane surface of each of the projecting portions, which is to face the printed circuit board, in order to bond the projecting portions to the printed circuit board.

5. The article of manufacture of the optical waveguide holding member as claimed in claim 1, wherein the part of the contact surface adjacent to the lens unit is bonded by the light curing adhesive to an adherend plate which provides better adhesion to the printed circuit board compared to the resin material, and peripheral edges of the adherend plate are bonded by the two-component mixed adhesive to the printed circuit board.

6. The article of manufacture of the optical waveguide holding member as claimed in claim 1, wherein a coating layer providing better adhesion to the printed circuit board compared to the resin material is disposed on the contact surface, part of the coating layer adjacent to the lens unit is bonded by the light curing adhesive to the printed circuit board, and the coating layer and peripheral edges of the contact surface are bonded to the printed circuit board.

7. The article of manufacture of the optical waveguide holding member as claimed in claim 1, wherein reinforcing members are fitted externally onto part of the optical waveguide holding member adjacent to the lens unit in order to reduce thermal expansion of the resin material.

8. The article of manufacture of the optical waveguide holding member as claimed in claim 1, wherein projecting portions are disposed, on lateral sides of the optical waveguide holding member, at part close to the lens unit, and fixing members engaging with the projecting portions are bonded to the printed circuit board in order to be fixed to the printed circuit board.

9. A mounting method of an optical waveguide holding member made of a resin material and including a contact surface on a bottom face thereof, which is to be in contact with a printed circuit board; a connection surface on a back face thereof, to which an optical fiber is to be connected; an optical waveguide disposed along a curved surface and connecting the contact surface and the connection surface; and a lens unit disposed at an end of the optical waveguide, the mounting method comprising the steps of:

applying a light curing adhesive to part of the contact surface which part is adjacent to the lens unit so that the part of the contact surface is bonded to the printed circuit board; and applying a two-component mixed adhesive to, along peripheries of the contact surface in contact with the printed circuit board, outer edges of lateral-side peripheries of the contact surface which lateral-side peripheries are adjacent to the lens unit and an outer edge of a back-side periphery of the contact surface which back-side periphery is close to the back face so that the lateral-side peripheries and the back-side periphery of the contact surface are bonded to the printed circuit board.

* * * * *

UNITED STATES PATENT AND TRADEMARK OFFICE
CERTIFICATE OF CORRECTION

| | | |
|---|---|---|
| PATENT NO. | : 7,894,691 B2 | Page 1 of 1 |
| APPLICATION NO. | : 12/426321 | |
| DATED | : February 22, 2011 | |
| INVENTOR(S) | : Yuko Ikeda, Toshihiro Kusagaya and Osamu Daikuhara | |

It is certified that error appears in the above-identified patent and that said Letters Patent is hereby corrected as shown below:

Title Page, item [75] inventor's citizenship should read as follows: "JP".

Signed and Sealed this
Third Day of May, 2011

David J. Kappos
*Director of the United States Patent and Trademark Office*